US011357065B2

(12) United States Patent
Shibata

(10) Patent No.: US 11,357,065 B2
(45) Date of Patent: Jun. 7, 2022

(54) COMMUNICATION DEVICE CAPABLE OF EXECUTING PROCESS FOR ESTABLISHING WIRELESS CONNECTION ACCORDING TO FIRST SCHEME OR SECOND SCHEME OF WI-FI STANDARD AND NON-TRANSITORY COMPUTER-READABLE RECORDING MEDIUM STORING COMPUTER READABLE INSTRUCTIONS FOR COMMUNICATION DEVICE

(71) Applicant: BROTHER KOGYO KABUSHIKI KAISHA, Nagoya (JP)

(72) Inventor: Hiroshi Shibata, Yatomi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 71 days.

(21) Appl. No.: 16/919,702

(22) Filed: Jul. 2, 2020

(65) Prior Publication Data
US 2021/0007164 A1 Jan. 7, 2021

(30) Foreign Application Priority Data

Jul. 4, 2019 (JP) .............................. JP2019-125432

(51) Int. Cl.
*H04W 76/14* (2018.01)
*G06F 3/12* (2006.01)
(Continued)

(52) U.S. Cl.
CPC .......... *H04W 76/14* (2018.02); *G06F 3/1218* (2013.01); *G06F 3/1236* (2013.01); *H04L 9/30* (2013.01);
(Continued)

(58) Field of Classification Search
CPC ... H04W 76/14; H04W 12/037; H04W 12/06; H04W 84/12; G06F 3/1218; G06F 3/1236; G06F 3/1292; H04L 9/30
(Continued)

(56) References Cited

U.S. PATENT DOCUMENTS

| | | | | |
|---|---|---|---|---|
| 2014/0085675 A1* | 3/2014 | Watanabe | .......... | H04N 1/32786 358/1.15 |
| 2014/0085676 A1* | 3/2014 | Kishimoto | ......... | H04N 1/32641 358/1.15 |

(Continued)

FOREIGN PATENT DOCUMENTS

JP 2018-037978 A 3/2018

OTHER PUBLICATIONS

Device Provisioning Protocol Technical Specification Version 1.0, Wi-Fi Alliance, 2018.
(Continued)

*Primary Examiner* — Allen H Nguyen
(74) *Attorney, Agent, or Firm* — Scully, Scott, Murphy & Presser, PC

(57) ABSTRACT

A communication device may output information according to a first scheme in a case where a first instruction is obtained in a first state, shift to a second state in a case where the first instruction is obtained in the first state, and shift to a third state in a case where a second instruction is obtained in the second state. In the first state, an authentication request according to the first scheme is not responded to and a search signal according to a second scheme is not responded to. In the second state, the authentication request using only a target channel can responded to and the search signal is not responded to. In the third state, the authentication request
(Continued)

using only the target channel can be responded and the search signal using only the target channel can be responded to.

21 Claims, 14 Drawing Sheets

(51) Int. Cl.
  *H04W 12/06* (2021.01)
  *H04L 9/30* (2006.01)
  *H04W 12/00* (2021.01)
  *H04W 12/037* (2021.01)
  *H04W 84/12* (2009.01)

(52) U.S. Cl.
  CPC ......... *H04W 12/037* (2021.01); *H04W 12/06* (2013.01); *G06F 3/1292* (2013.01); *H04W 84/12* (2013.01)

(58) Field of Classification Search
  USPC .......................................................... 358/1.15
  See application file for complete search history.

(56) References Cited

U.S. PATENT DOCUMENTS

2017/0265244 A1* 9/2017 Nogawa ................ H04W 76/15
2018/0069718 A1* 3/2018 Terao ...................... H04L 12/28
2018/0077255 A1* 3/2018 Goto ...................... H04W 12/04

OTHER PUBLICATIONS

Wi-Fi Peer-to-Peer (P2P) Technical Specification Version 1.1, Wi-Fi Alliance.

* cited by examiner

FIG. 8
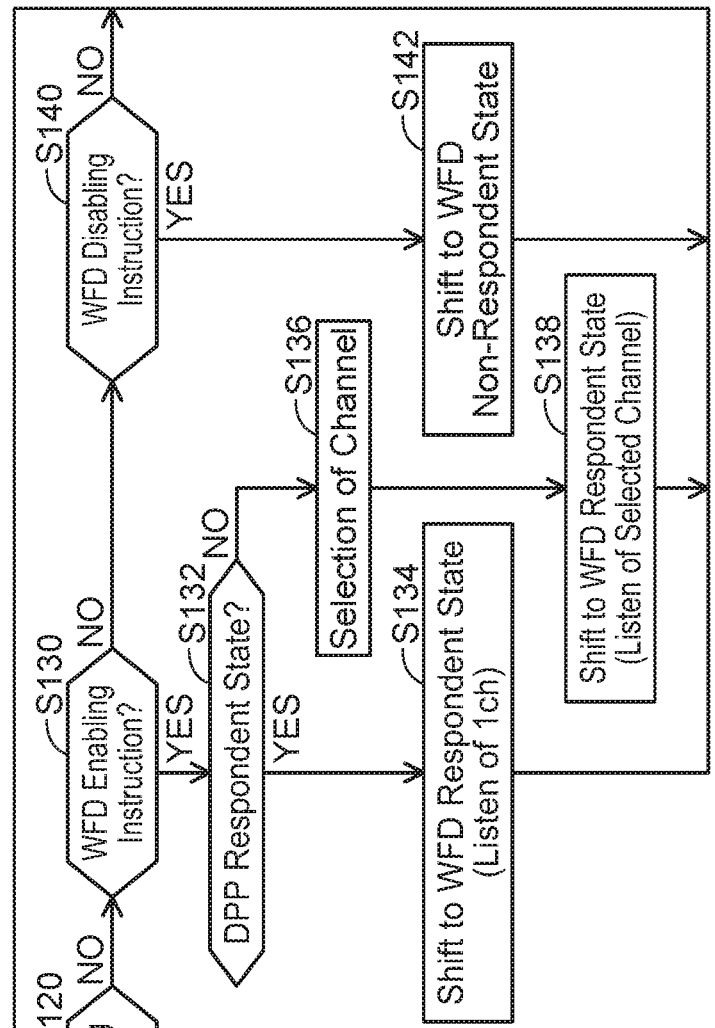
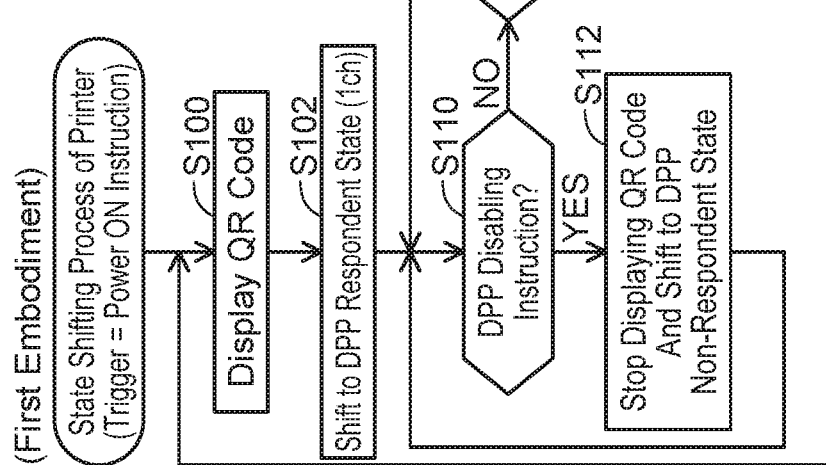

(Second Embodiment Case E)

COMMUNICATION DEVICE CAPABLE OF EXECUTING PROCESS FOR ESTABLISHING WIRELESS CONNECTION ACCORDING TO FIRST SCHEME OR SECOND SCHEME OF WI-FI STANDARD AND NON-TRANSITORY COMPUTER-READABLE RECORDING MEDIUM STORING COMPUTER READABLE INSTRUCTIONS FOR COMMUNICATION DEVICE

CROSS-REFERENCE TO RELATED APPLICATION

This application claims priority to Japanese Patent Application No. 2019-125432, filed on Jul. 4, 2019, the entire contents of which are incorporated herein by reference.

TECHNICAL FIELD

The description herein discloses an art for establishing a wireless connection between a communication device and another device.

BACKGROUND

A Device Provisioning Protocol scheme (hereinafter termed "DPP scheme"), which is a wireless communication scheme established by Wi-Fi Alliance, is known. The DPP scheme is a scheme for easily establishing a wireless connection according to Wi-Fi (Registered Trademark, Wi-Fi Alliance) standard between a pair of devices.

For example, a system provided with a smartphone, a camera, a printer, and an access point is known. The printer is connected to a wireless network formed by the access point as a station. When the printer is to display a QR Code (Registered Trademark, Denso Wave Incorporated Corporation) according to the DPP scheme in this state, the printer displays a QR Code representing a value identical to a frequency channel used in the aforementioned wireless network. Then, the printer shifts to a standby state for receiving an authentication request from a communication counterpart device in this frequency channel. When the smartphone captures an image of the QR Code, the smartphone sends an authentication request using the aforementioned frequency channel. Thus, the printer can receive this authentication request, after which the printer receives communication parameters from the smartphone and newly establishes a wireless network. Further, the camera also displays the QR Code and shifts to a standby state for receiving an authentication request, and receives the communication parameters from the smartphone. Then, the camera connects to the wireless network, to which the printer is also connected.

SUMMARY

In the aforementioned technique, in a situation in which the printer shifts to the standby state for receiving an authentication request according to the DPP scheme while the printer is in the state of being connected to a certain wireless network, the printer uses the channel identical to the frequency channel used in the certain wireless network. The description herein provides an art that uses a method different from the aforementioned technique and allows a communication device to shift to a standby state for receiving a signal in a suitable channel.

A communication device disclosed herein may comprise: a wireless interface configured to execute wireless communication according to Wi-Fi standard; an output unit; and a controller configured to: execute a process for establishing a wireless connection between the communication device and another device via the wireless interface according to a first scheme of the Wi-Fi standard; and execute a process for establishing a wireless connection between the communication device and another device via the wireless interface according to a second scheme of the Wi-Fi standard, the second scheme being different from the first scheme, wherein in a case where a first instruction for enabling communication according to the first scheme is obtained while a state of the communication device is a first state, the process for establishing the wireless connection according to the first scheme includes: executing an output control process for causing the output unit to externally output output-information according to the first scheme, the output-information being information obtained by using channel information indicating a target channel and a public key of the communication device, the target channel being one of a plurality of channels which the wireless interface is capable of using; and shifting the state of the communication device from the first state to a second state, the first state being a state in which the communication device does not respond to an authentication request according to the first scheme and does not respond to a search signal according to the second scheme, the second state being a state in which the communication device is capable of responding to the authentication request using only the target channel among the plurality of channels and does not respond to the search signal, wherein in a case where a second instruction for enabling a communication according to the second scheme is obtained while the state of the communication device is the second state, the process for establishing the wireless connection according to the second scheme includes: shifting the state of the communication device from the second state to a third state, the third state being a state in which the communication device is capable of responding to the authentication request using only the target channel among the plurality of channels and is capable of responding to the search signal using only the target channel among the plurality of channels.

Another communication device disclosed herein may comprise: a wireless interface configured to execute wireless communication according to Wi-Fi standard; an output unit; and a controller configured to: execute a process for establishing a wireless connection between the communication device and another device via the wireless interface according to a first scheme of the Wi-Fi standard; and execute a process for establishing a wireless connection between the communication device and another device via the wireless interface according to a second scheme of the Wi-Fi standard, the second scheme being different from the first scheme, wherein in a case where a second instruction for enabling communication according to the second scheme is obtained while a state of the communication device is a first state, the process for establishing the wireless connection according to the second scheme includes: shifting the state of the communication device from the first state to a second state, the first state being a state in which the communication device does not respond to an authentication request according to the first scheme and does not respond to a search signal according to the second scheme, the second state being a state in which the communication device does not respond to the authentication request and is capable of responding to the search signal using only a first channel, the first channel being one of a plurality of channels which the wireless interface is capable of using, wherein in a case where a first instruction for enabling a communication according to the first scheme is obtained while the state of the communication device is the second state, the process for establishing the wireless connection according to the first scheme includes: executing an output control process for causing the output unit to externally output output-information according to the first scheme, the output-information being information obtained by using channel information indicating a second channel different from the first channel among the plurality of channels and a public key of the communication device; and shifting the state of the communication device from the second state to a third state, the third state being a state in which the communication device is capable of responding to the authentication request using only the second channel among the plurality of channels and is capable of responding to the search signal using only the second channel among the plurality of channels.

A control method and a computer program for realizing the aforementioned communication device, as well as a computer-readable recording medium storing the computer program are also novel and useful. Further, a communication system provided with the aforementioned communication device and another device is also novel and useful.

BRIEF DESCRIPTION OF DRAWINGS

FIG. 8 shows a flowchart of a state shilling process of the printer;

DETAILED DESCRIPTION

Figure 1:
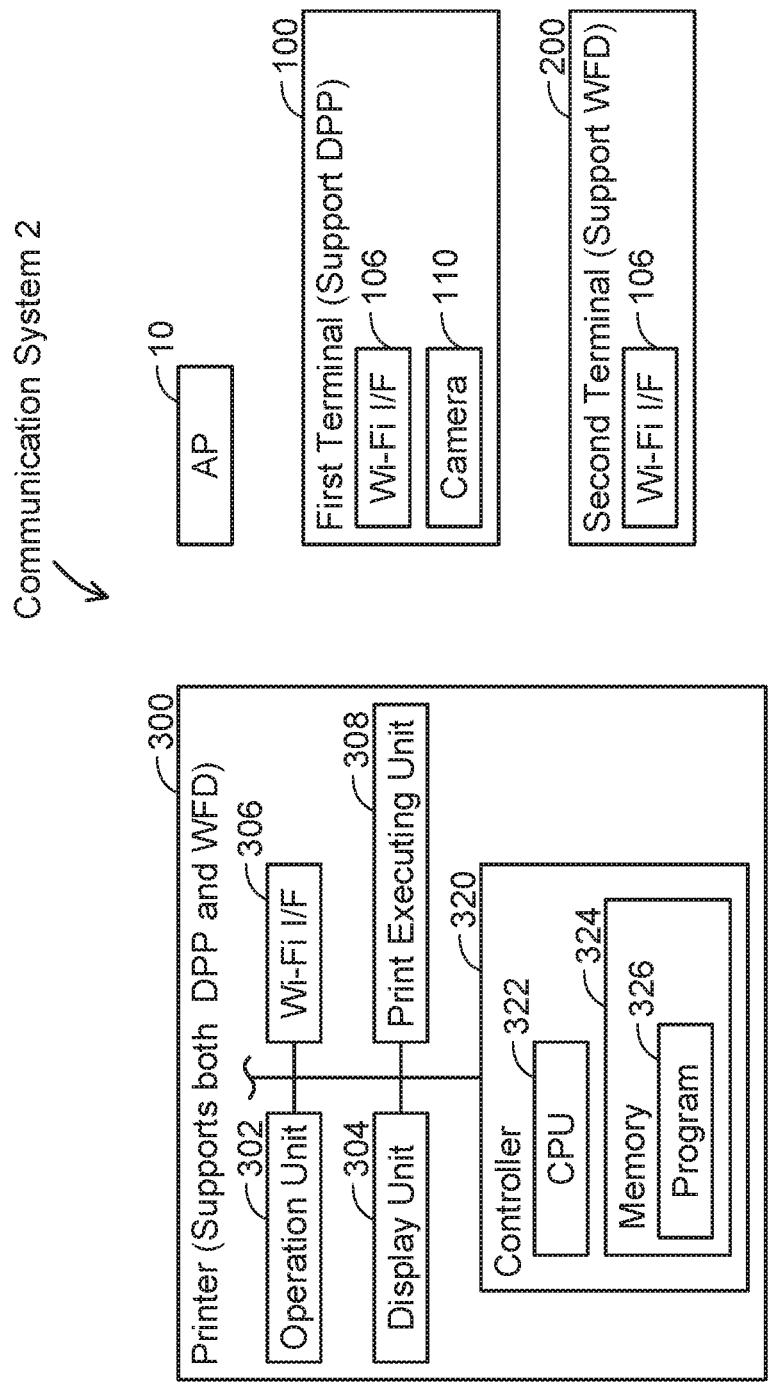
FIG. 1 shows a configuration of a communication system.

First Embodiment (Configuration of Communication System 2; FIG. 1)

As shown in FIG. 1, a communication system 2 is provided with an Access Point (hereinafter "AP") 10, a first terminal 100, a second terminal 200, and a printer 300. In the present embodiment, a situation is assumed in which a user uses the first terminal 100 to establish a wireless connection according to a Wi-Fi standard (hereinafter termed "Wi-Fi connection") between the printer 300 and the AP 10, and establish a Wi-Fi connection between the second terminal 200 and the printer 300.

(Configuration of First Terminal 100)

The first terminal 100 is a mobile terminal device such as a cellphone (such as a smartphone), a PDA, or a tablet PC. In a variant, the first terminal 100 may be a stationary terminal device. The first terminal 100 is provided with a Wi-Fi interface 106 and a camera 110. Hereinafter, an interface will be abbreviated to "I/F".

The Wi-Fi I/F 106 is a wireless interface configured to execute Wi-Fi communication according to the Wi-Fi standard. The Wi-Fi standard is a wireless communication standard for executing wireless communication according to 802.11 standard of the Institute of Electrical and Electronics Engineers, Inc. (IEEE) and standards complying thereto (such as 802.11a, 11b, 11g, 11n, 11ac, etc.), for example. The Wi-Fi I/F 16 supports a Device Provisioning Protocol (DPP) scheme that is established by the Wi-Fi Alliance. The DPP scheme is described in the standard "Device Provisioning Protocol Technical Specification Version 1.0" created by the Wi-Fi Alliance, and is a connection scheme for easily establishing a Wi-Fi connection between a pair of devices (e.g. the printer 300 and the AP 10) by using the first terminal 100. Hereinafter, the established Wi-Fi connection according to the DPP scheme may be termed "DPP connection".

The camera 110 is a device for capturing an image of an object, and in the present embodiment, it is used to capture a QR Code for the AP 10 and the printer 300.

(Configuration of Second Terminal 200)

The second terminal 200 is also a mobile terminal device similar to the first terminal 100. In a variant, the second terminal 200 may be a stationary device. The second terminal 200 is provided with a Wi-Fi interface 206.

The Wi-Fi I/F 206 supports Wi-Fi DIRECT (WFD) (Registered Trademark, Wi-Fi Alliance) scheme established by the Wi-Fi Alliance. The WFD scheme is a connection scheme described in the standard "Wi-Fi Peer-to-Peer (P2P) Technical Specification Version1.1" created by the Wi-Fi Alliance. In the WFD, Group Owner state (hereinafter termed "G/O state") and Client state (hereinafter termed "CL state") are defined. Further, a state which is different from both the G/O state and the CL state is termed "device state" herein. The device which supports the WFD scheme is capable of selectively operating in one of the above three states. Hereinafter, the Wi-Fi connection established according to the WFD scheme may be termed "WFD connection".

(Configuration of Printer 300)

The printer 300 is a peripheral device (e.g., a peripheral device working with the first terminal 100 and the second terminal 200) that is capable of executing a print function.

The printer 300 is provided with an operation unit 302, a display unit 304, a Wi-Fi I/F 306, a print executing unit 308, and a controller 320. The respective units 302 to 320 are connected to a bus line (for which a reference sign is not given).

The operation unit 302 includes a plurality of buttons. The operation unit 302 enables the user to input various instructions to the printer 300 through the operation unit 302. The display unit 304 is a display configured to display various types of information. The display unit 304 may also include a touchscreen function (i.e. operation unit). Hereinafter, the operation unit 302 and the display unit 304 with the touchscreen function may be collectively termed "the operation unit 302, 304". The print executing unit 308 includes a printing engine such as an inkjet technology or a laser technology.

The Wi-Fi I/F 306 supports both the DPP scheme and the WFD scheme. Due to this, the printer 300 is capable of establishing the DPP connection with the AP 10 and further establishing the WFD connection with the second terminal 200.

The controller 320 includes a CPU 322 and a memory 324. The CPU 322 is configured to execute various processes according to a program 326 stored in the memory 324. The memory 324 may be a volatile memory, a non-volatile memory, and/or the like.

Figure 2:
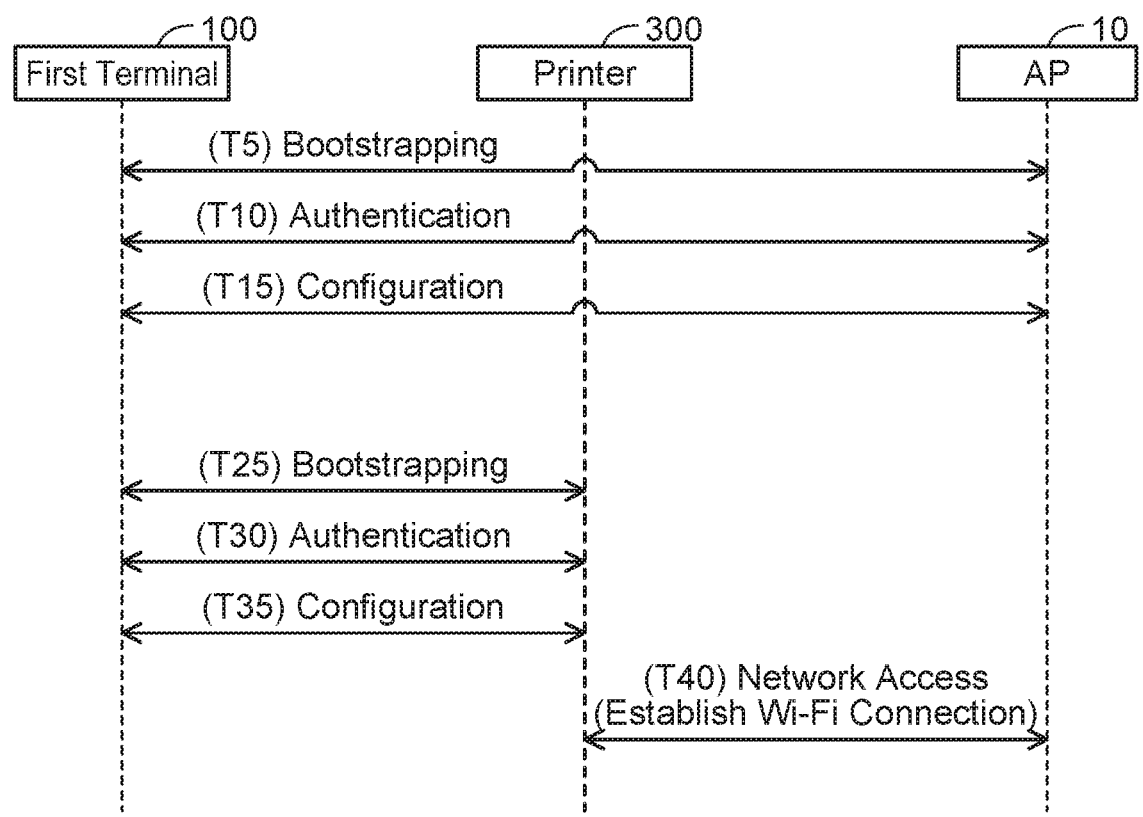
FIG. 2 shows a schematic sequence diagram of a process for establishing a Wi-Fi connection according to a DPP scheme between a printer and an access point.

(Overview of the DPP; FIG. 2)

Next, an overview of the DPP will be described with reference to FIG. 2. The AP 10 also supports the DPP scheme. In the present embodiment, the DPP connection between the printer 300 and the AP 10 is established by each of the devices 10, 100, 300 executing communication according to the DPP scheme. Hereinafter, to facilitate understanding, operations which CPUs (such as the CPU 322) of the respective devices will be described with the devices (such as the printer 300) as subjects of action instead of describing the operations with the CPUs as the subjects of action.

In T5, the first terminal 100 executes Bootstrapping (hereinafter abbreviated to "BS") according to the DPP scheme with the AP 10. The BS is a process of providing information that is to be used in Authentication (hereinafter abbreviated to "Auth") of T10 (to be described later) from the AP 10 to the first terminal 100 in response to a QR Code adhered to the AP 10 being captured by the camera 110 of the first terminal 100.

In T10, the first terminal 100 executes Auth according to the DPP scheme with the AP 10 by using the information obtained in the BS of T5. This Auth is a process for the first terminal 100 and the AP 10 to authenticate their communication counterparts.

In T15, the first terminal 100 executes Configuration (hereinafter abbreviated to "Config") according to the DPP scheme with the AP 10. This Config is a process of sending information for the AP 10 establishing the DPP connection to the AP 10. Specifically, the first terminal 100 generates a Configuration Object (hereinafter, Configuration Object is abbreviated to "CO") for AP (hereinafter "AP-CO"), and sends the AP-CO to the AP 10. As a result, the AP-CO is stored in the AP 10.

Next, the first terminal 100 executes BS according to the DPP scheme with the printer 300 in T25. This BS is a process of providing information that is to be used in Auth of T30 (to be described later) from the printer 300 to the first terminal 100 in response to a QR Code displayed in the printer 300 being captured by the camera 110 of the first terminal 100.

In T30, the first terminal 100 executes Auth according to the DPP scheme with the printer 300 by using the information obtained in the BS of T25. This Auth is a process for the first terminal 100 and the printer 300 to authenticate each other.

In T35, the first terminal 100 executes Config according to the DPP scheme with the printer 300. This Config is a process of sending information to the printer 300 for establishing the DPP connection between the printer 300 and the AP 10. In this Config, the first terminal 100 generates a CO for printer (hereinafter "printer-CO") for establishing the DPP connection between the printer 300 and the AP 10, and sends the printer-CO to the printer 300. As a result, the printer-CO is stored in the printer 300.

In T40, the printer 300 and the AP 10 execute the Network Access (hereinafter abbreviated to "NA") according to the DPP scheme by using the stored AP-CO and printer-CO. The NA is a process for the printer 300 and the AP 10 to share a connection key for establishing the DPP connection. Then, the printer 300 and the AP 10 execute 4way-handshake communication. In at least a part of the 4way-handshake communication, the printer 300 and the AP 10 communicate encrypted information encrypted by the shared connection key. Further, in a case where decryption of the encrypted information is successful, the DPP connection is established between the printer 300 and the AP 10. Thus, the printer 300 can participate, as a child station, in a wireless network formed by the AP 10. In a variant, the printer 300 and the AP 10 may execute Simultaneous Authentication of Equals (SAE, also called "Dragonfly") communication, instead of the 4way-handshake communication.

In the DPP scheme, the user does not need to input information of the wireless network in which the AP 10 operates as a parent station (such as a Service Set Identifier (SSID) and a password) to the printer 300 in order to establish the DPP connection between the printer 300 and the AP 10. As such, the user can easily establish the Wi-Fi connection between the printer 300 and the AP 10.

(Description on Respective Processes; FIGS. 3 to 6)

Next, details of the respective processes executed in T25 to T40 of FIG. 2 will be described with reference to FIGS. 3 to 6. Since the processes of T5 to T15 are similar to the processes of T25 to T35 except that the AP 10 is used instead of the printer 300, the detailed description thereof will be omitted.

Figure 3:
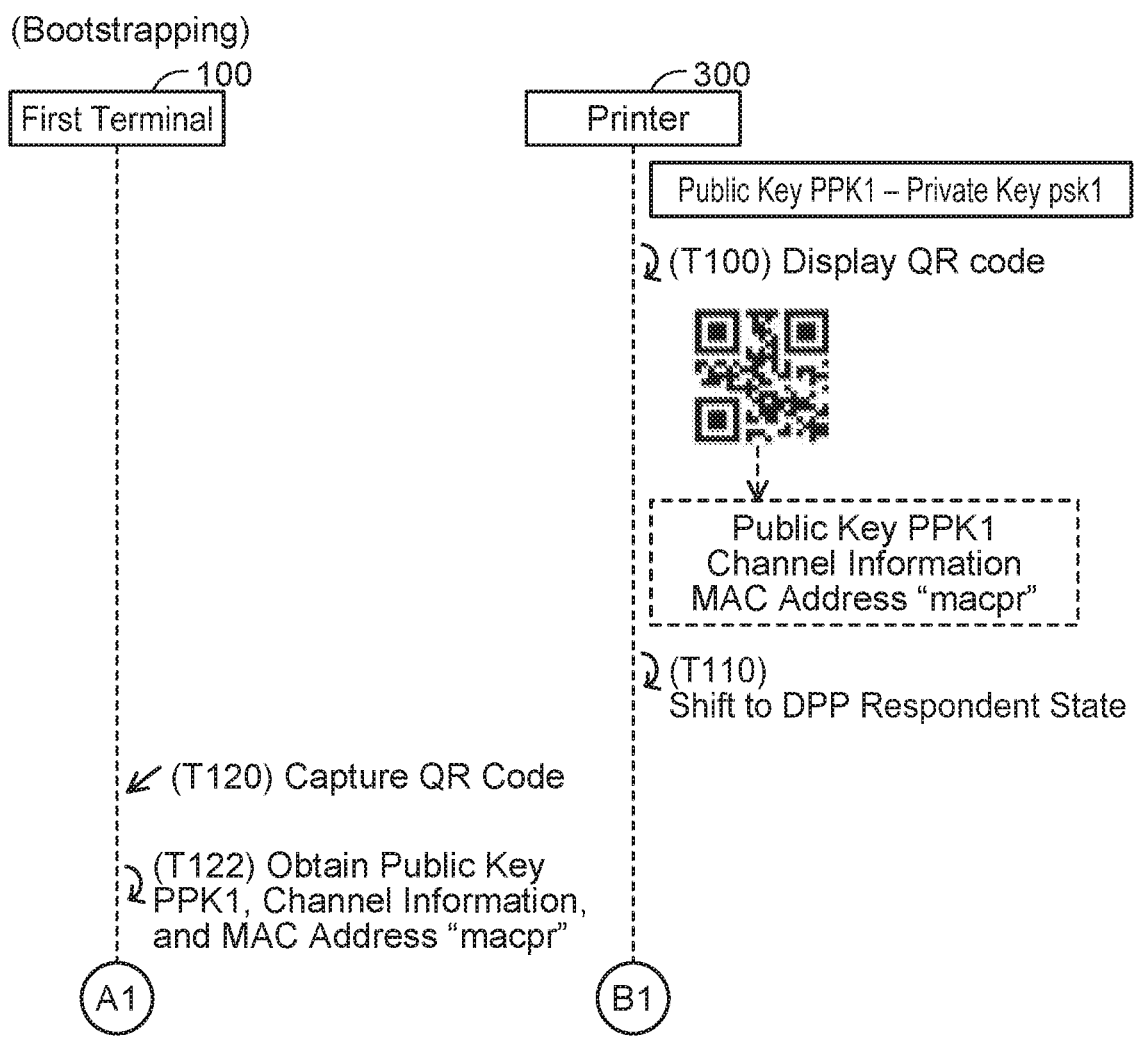
FIG. 3 shows a sequence diagram of a Bootstrapping process.

(Bootstrapping (BS); FIG. 3)

Firstly, the process of the BS executed in T25 of FIG. 2 will be described with reference to FIG. 3. In an initial state of FIG. 3, the memory 324 of the printer 300 stores a public key PPK1 and a private key psk1 of the printer 300 in advance.

In T100, the printer 300 causes the display unit 304 to display a QR Code. This QR Code is obtained by coding the public key PPK1 of the printer 300, channel information of the printer 300, and the MAC address "macpr" of the Wi-Fi I/F 306 of the printer 300. The channel information is information for indicating one channel (hereinafter termed "DPP channel") among a plurality of channels (that is, a frequency bandwidth) which the Wi-Fi I/F 306 is capable of using. In the present embodiment, the above plurality of channels is thirteen channels of 1ch to 13ch.

In T110, the printer 300 shifts to the DPP respondent state. The DPP respondent state is a state of being capable of responding to an authentication request (that is, DPP Authentication Request to be described later) sent from the first terminal 100 in response to the QR Code displayed in T100 being captured by the first terminal 100. In particular, the DPP respondent state in T110 is a state of being capable of responding to the authentication request using only the DPP channel among the plurality of channels. In other words, in the DPP respondent state in T110, the printer 300 stands by for the authentication request at the DPP channel. That is, the printer 300 sends an authentication response (that is, a DPP Authentication Response to be described later) in response to receiving the authentication request using the DPP channel, but does not send any authentication response in response to an authentication request at any channel other than the DPP channel. Here, "not send any authentication response in response to an authentication request" includes the printer 300 not being capable of receiving the authentication request as well as the printer 300 being capable of receiving the authentication request but configured not to send the authentication response even when the authentication request is received.

In response to accepting an operation by the user, the first terminal 100 activates the camera 110 and captures the QR Code displayed in T100 using the camera 110. Further, in T122, the first terminal 100 decodes the captured QR Code and obtains the public key PPK1, the channel information, and the MAC address "macpr". When the process of T122 is completed, the process of FIG. 3 is terminated.

Figure 4:
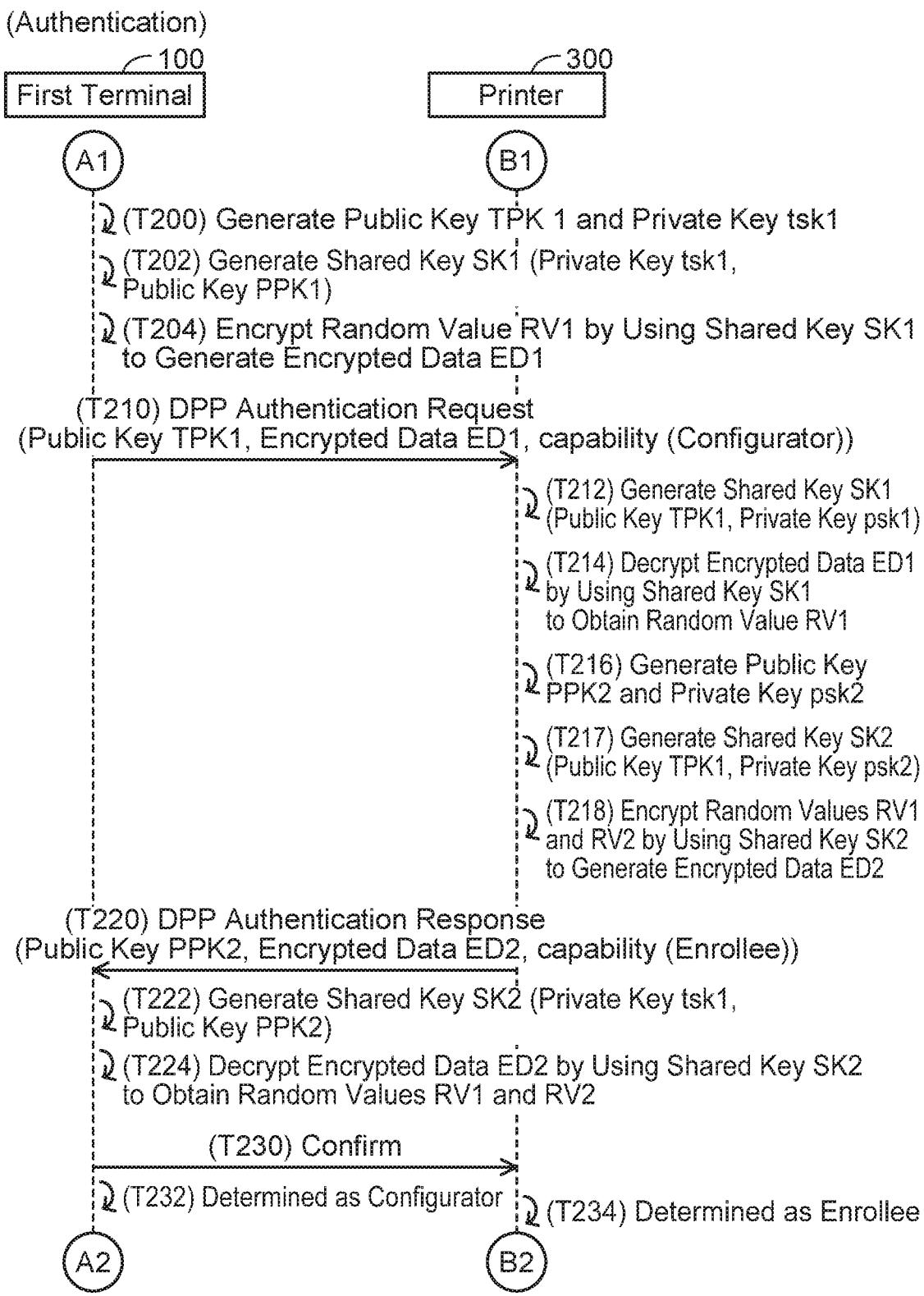
FIG. 4 shows a sequence diagram of an Authentication process.

(Authentication (Auth); FIG. 4)

Next, the process of the Auth executed in T30 of FIG. 2 will be described with reference to FIG. 4. All the communication as hereinafter executed between the first terminal 100 and the printer 300 is implemented via the Wi-Fi I/F 106 of the first terminal 100 and the Wi-Fi I/F 306 of the printer 300. Therefore, hereinafter, the description "via the Wi-Fi I/F 106 (or 306)" will be omitted.

In T200, the first terminal 100 generates a public key TPK1 and a private key tsk1 of the first terminal 100. Next, in T202, the first terminal 100 generates a shared key SK1 according to Elliptic curve Diffie-Hellman key exchange (ECDH) by using the generated private key tsk1 and the public key PPK1 of the printer 300 obtained in T122 of FIG. 3. Then, in T204, the first terminal 100 generates encrypted data ED1 by using the generated shared key SK1 to encrypt a random value RV1.

In T210, the first terminal 100 sends an Authentication Request (hereinafter abbreviated to "AReq") to the printer 300 by setting the MAC address "macpr" obtained in T122 of FIG. 3 as its destination. The AReq is a signal for requesting the printer 300 to execute authentication. The AReq includes the public key TPK1 of the first terminal 100 generated in T200, the encrypted data ED1 generated in T204, and a capability of the first terminal 100. Here, the first terminal 100 repeats sending the AReq to the printer 300 using the DPP channel indicated by the channel information obtained in T122 of FIG. 3.

The capability is information that is pre-designated in a device supporting the DPP scheme, and includes any one of the following values: a value indicating that this device is capable of operating only as a Configurator according to the DPP scheme, a value indicating that this device is capable of operating only as an Enrollee according to the DPP scheme, and a value indicating that this device is capable of operating whichever one of the Configurator and the Enrollee. The Configurator refers to a device configured to send a CO used in the NA (e.g., T40 of FIG. 2) to an Enrollee in the Config (e.g., T35 of FIG. 2). On the other hand, the Enrollee refers to a device that receives the CO used in the NA from the Configurator in the Config. As above, in the present embodiment, the first terminal 100 generates the AP-CO and the printer-CO and sends them respectively to the AP 10 and the printer 300. As such, the capability of the first terminal 100 includes the value indicating that it is capable of operating only as the Configurator.

The printer 300 receives the AReq from the first terminal 100 in T210. As above, this AReq is sent with the MAC address "macpr" of the printer 300 as the destination. As such, the printer 300 can suitably receive the AReq from the first terminal 100.

Further, the AReq is sent by using the DPP channel as above. Since the printer 300 shifts to the state standing by for the AReq using the DPP channel in T110 of FIG. 3, the printer 300 can suitably receive the AReq using the DPP channel from the first terminal 100. Here, a comparative example is assumed in which a QR Code including channel information indicating two or more channels is displayed in T100 of FIG. 3, and the printer 300 shifts to a state standing by for the AReq while switching the two or more channels in T110 of FIG. 3. In this case, the printer 300 cannot receive an AReq unless a period during which the printer 300 stands by for the AReq using a certain channel and a timing when the ARes using this certain channel is sent from the first terminal 100 match each other. Due to this, some time may be required before the printer 300 receives the AReq. Contrary to this, in the present embodiment, since the printer 300 shifts to a state standing by for the AReq using only the DPP channel that is one channel, the printer 300 can receive the AReq using the DPP channel from the first terminal 100 more promptly than the comparative example. Further, the DPP channel is used in all the communication to be implemented as below between the first terminal 100 and the printer 300.

Next, the printer 300 executes following processes for authenticating the sender of the AReq (that is, the first terminal 100). Specifically, in T212, the printer 300 generates a shared key SK1 according to the ECDH by using the public key TPK1 of the first terminal 100 in the AReq and the private key psk1 of the printer 300. Here, the shared key SK1 generated by the first terminal 100 in T202 and the shared key SK1 generated by the printer 300 in 1212 are identical to each other. Thus, the printer 300 can suitably decrypt the encrypted data ED1 in the AReq by using the generated shared key SK1 in T214, as a result of which it can obtain the random value RV1. In a case where the decryption of the encrypted data ED1 succeeds, the printer 300 determines that the sender of the AReq is the device that captured the QR Code displayed in T100 of FIG. 3, that is, determines that the authentication succeeded, and executes subsequent processes from T216. On the other hand, in a case where the decryption of the encrypted data ED1 does not succeed, the printer 300 determines that the sender of the AReq is not the device that captured the QR Code displayed in T100, that is, determines that the authentication failed, and does not execute the subsequent processes from T216.

In T216, the printer 300 generates a new public key PPK2 and a new private key psk2 of the printer 300. In a variant, the public key PPK2 and the private key psk2 may be stored in advance in the printer 300. Next, in T217, the printer 300 generates a shared key SK2 according to the ECDH by using the public key TPK1 of the first terminal 100 in the AReq of T210 and the generated private key psk2 of the printer 300. Then, in 1218, the printer 300 generates encrypted data ED2 by using the generated shared key SK2 to encrypt the obtained random value RV1 and a new random value RV2.

In T220, the printer 300 sends an Authentication Response (hereinafter abbreviated to "ARes") to the first terminal 100. This ARes includes the public key PPK2 of the printer 300 generated in T216, the encrypted data ED2 generated in T218, and a capability of the printer 300. This capability includes the value indicating that the printer 300 is capable of operating only as the Enrollee.

In T220, the first terminal 100 receives the ARes from the printer 300. In this case, the first terminal 100 executes processes for authenticating the sender of the ARes (that is, the printer 300). Specifically, firstly in 1222, the first terminal 100 generates a shared key SK2 according to the ECDH by using the private key tsk1 of the first terminal 100 generated in T200 and the public key PPK2 of the printer 300 in the ARes. Here, the shared key SK2 generated by the printer 300 in T217 and the shared key SK2 generated by the first terminal 100 in 1222 are identical to each other. Thus, the first terminal 100 can suitably decrypt the encrypted data ED2 in the ARes by using the generated shared key SK2 in T224, as a result of which it can obtain the random values RV1 and RV2. In a case where the decryption of the encrypted data ED2 succeeds, the first terminal 100 determines that the sender of the ARes is the device that displayed the captured QR Code, that is, determines that the authentication succeeded, and executes subsequent processes from T230. On the other hand, in a case where the decryption of the encrypted data ED2 does not succeed, the first terminal 100 determines that the sender of the ARes is not the device that displayed the captured QR Code, that is, determines that the authentication failed, and does not execute the subsequent processes from T230.

In T230, the first terminal 100 sends a Confirm to the printer 300. The Confirm includes information indicating that the first terminal 100 operates as the Configurator and the printer 300 operates as the Enrollee. As a result, the first terminal 100 determines to operate as the Configurator in T232, and the printer 300 determines to operate as the Enrollee in 1234. When the process of T234 is completed, the process of FIG. 4 is terminated.

Figure 5:
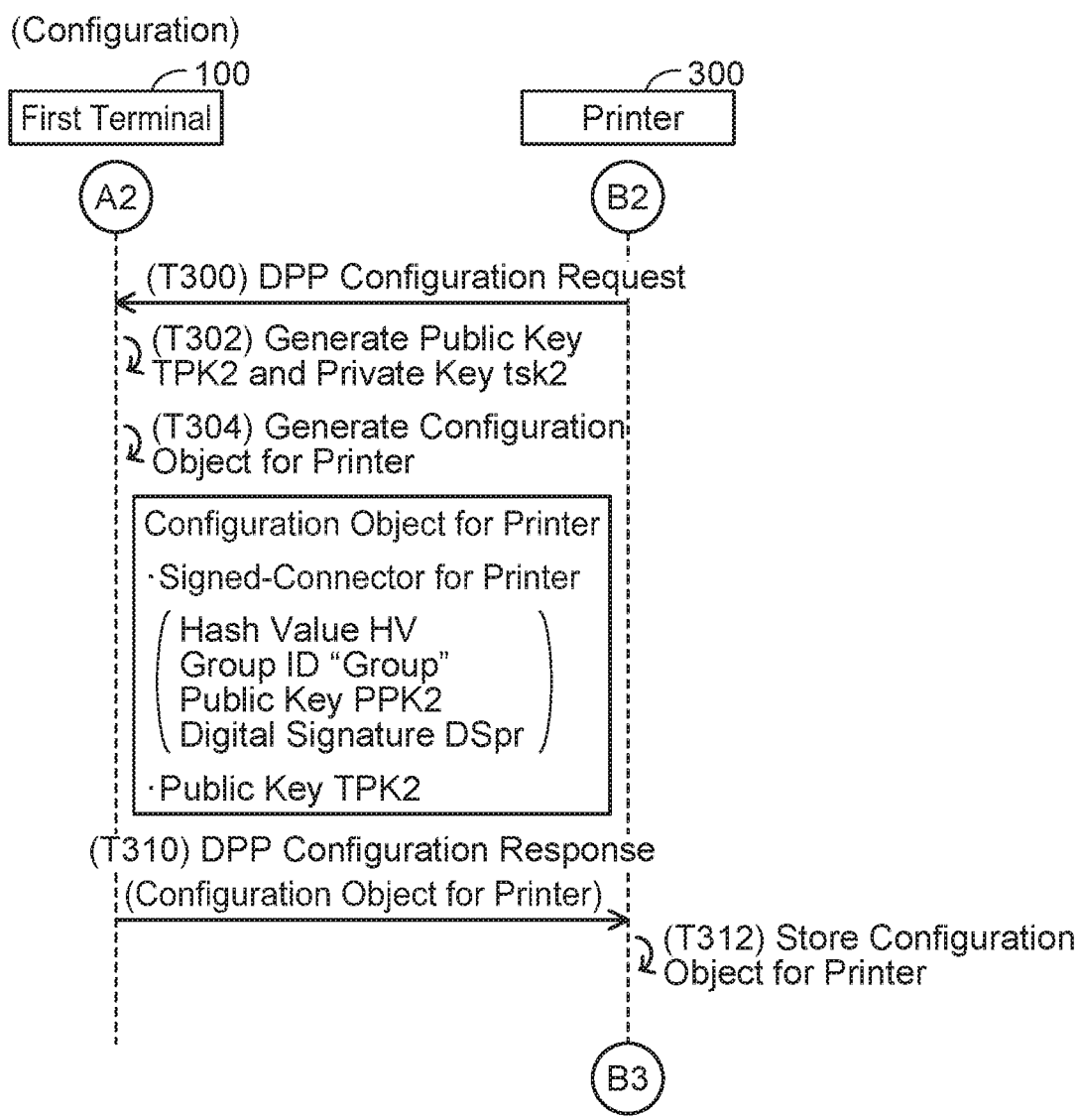
FIG. 5 shows a sequence diagram of a Configuration process.

(Configuration (Config); FIG. 5)

Next, the process of the Config executed in T35 of FIG. 2 will be described with reference to FIG. 5. In T300, the printer 300 sends a DPP Configuration Request (hereinafter abbreviated to "CReq") to the first terminal 100. This CReq is a signal requesting the printer-CO to be sent.

The first terminal 100 receives the CReq from the printer 300 in T300. In this case, the first terminal 100 generates a new public key TPK2 and a new private key tsk2 of the first terminal 100 in T302. Next, in T304, the first terminal 100 generates the printer-CO by using the generated private key tsk2. Specifically, the first terminal 100 executes following processes.

Firstly, the first terminal 100 generates a hash value HV by hashing the public key TPK2 of the first terminal 100. Further, the first terminal 100 generates a specific value by hashing a combination of the hash value HV, the group ID "Group", and the public key PPK2 of the printer 300 in the ARes in T220 of FIG. 4. Then, the first terminal 100 generates a digital signature DSpr by using the private key tsk2 of the first terminal 100 to encrypt the generated specific value according to an Elliptic Curve Digital Signature Algorithm (ECDSA). As a result, the first terminal 100 can generate a Signed-Connector for printer (hereinafter, the Signed-Connector is abbreviated to "SC") including the hash value HV, the group ID "Group", the public key PPK2 of the printer 300, and the digital signature DSpr. Further, the first terminal 100 generates the printer-CO including the SC for printer (hereafter, "printer-SC") and the public key TPK2 of the first terminal 100.

In T310, the first terminal 100 sends a DPP Configuration Response (hereinafter abbreviated to "CRes") including the printer-CO to the printer 300.

The printer 300 receives the CRes from the first terminal 100 in T310. In this case, the printer 300 stores the printer-CO in the CRes in T312. The printer-CO is information that is to be used in the DPP connection with the AP 10 and can be called connection information for establishing the DPP connection with the AP 10. When the process of T312 is completed, the process of FIG. 5 is terminated.

Figure 6:
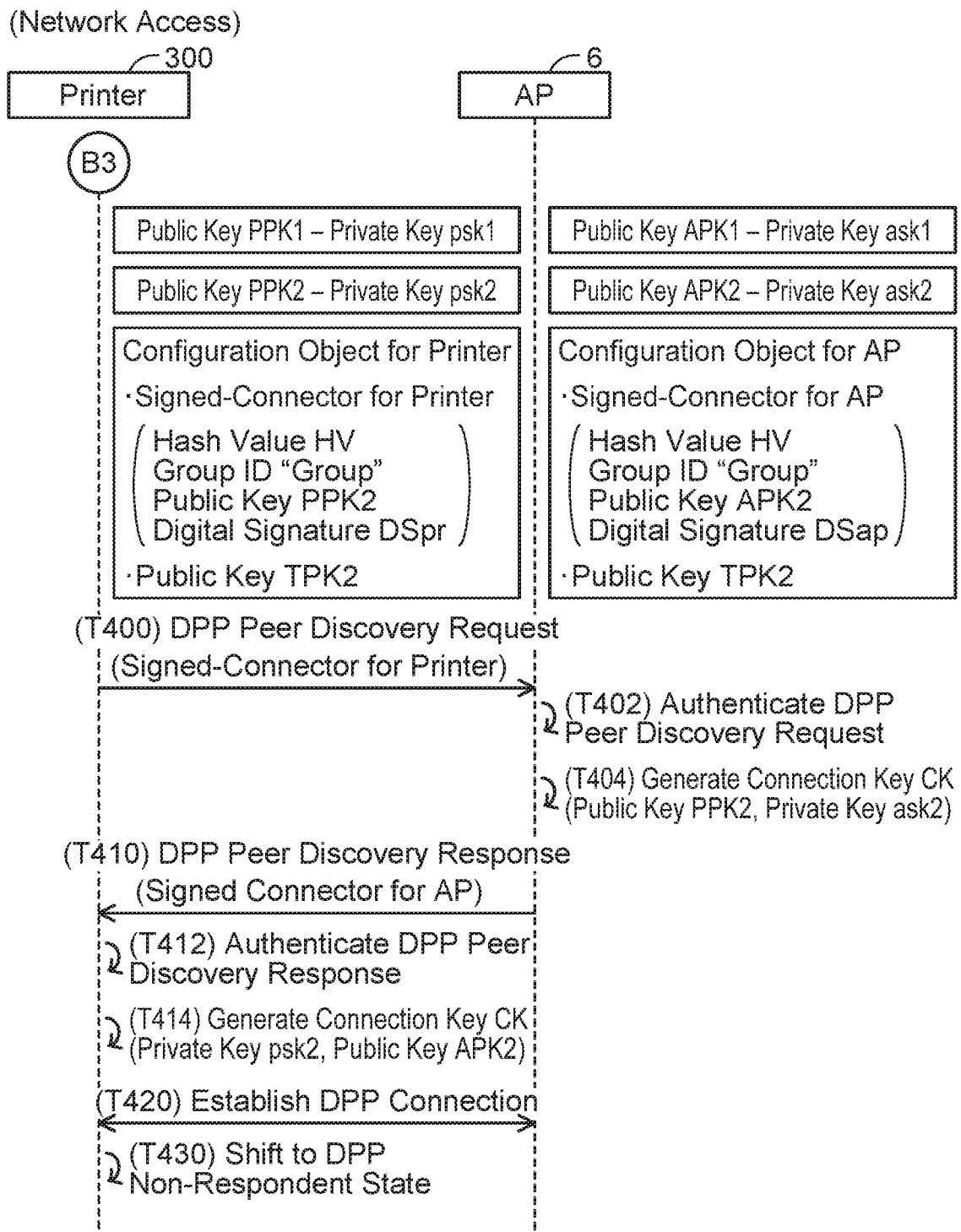
FIG. 6 shows a sequence diagram of a Network Access process.

(Network Access (NA); FIG. 6)

Next, the process of the NA in T40 of FIG. 2 will be described with reference to FIG. 6. As aforementioned, the processes of T5 to T15 of FIG. 2 have already been executed between the first terminal 100 and the AP 10, similarly to T25 to T35 of FIG. 2. The AP 10 stores in advance a public key APK1 and a private key ask1 of the AP 10. Further, a QR Code, which is obtained by coding the public key APK1 of the AP 10, channel information of the AP 10, and a MAC address of the AP 10, is adhered to a housing of the AP 10. Processes similar to the processes from T200 of FIG. 4 are executed between the first terminal 100 and the AP 10 when the first terminal 100 captures this QR Code. As a result, the AP 10 stores a public key APK2 and a private key ask2 of the AP 10 (see T216 of FIG. 4), and further stores the AP-CO received from the first terminal 100 (see T312 of FIG. 5). The AP-CO includes a SC for AP (hereafter, "AP-SC") and a public key TPK2 of the first terminal 100. This public key TPK2 is identical to the public key TPK2 included in the printer-CO. Further, the AP-SC includes a hash value HV, a group ID "Group", the public key APK2 of the AP 10, and a digital signature DSap. This hash value HV and this group ID "Group" are respectively identical to the hash value HV and the group ID "Group" included in the printer-CO. The digital signature DSap is information in which a specific value, which is obtained by hashing a combination of the hash value HV, the group ID "Group", and the public key APK2, are encrypted by the private key tsk2 of the first terminal 100, and is a value different from the digital signature DSpr included in the printer-CO.

In T400, the printer 300 sends a DPP Peer Discovery Request (hereinafter abbreviated to "DReq") including the printer-SC to the AP 10. The DReq is a signal requesting the AP 10 to execute authentication and send the AP-SC.

In response to receiving the DReq from the printer 300 in T400, the AP 10 executes a process for authenticating the sender of the DReq (that is, the printer 300) and the respective kinds of information in the DReq (that is, the hash value HV, the "Group", and the public key PPK2). Specifically, in T402, the AP 10 firstly executes a first AP determination process that is regarding whether or not the hash value HV and the group ID "Group" in the received printer-SC are respectively identical to the hash value HV and the group ID "Group" in the AP-SC included in the stored AP-CO. In the case of FIG. 6, the AP 10 determines "identical" in the first AP determination process, thus it determines that the authentication of the sender of the DReq (that is, the printer 300) succeeds. Here, the fact that the hash value HV in the received printer-SC is identical to the hash value HV in the AP-SC included in the stored AP-CO means that the printer-SC and the AP-SC were generated by the same device (that is, the first terminal 100). As such, the AP 10 also determines that authentication of the creator of the received printer-SC (that is, the first terminal 100) succeeds.

Further, the AP 10 decrypts the digital signature DSpr in the received printer-SC by using the public key TPK2 of the first terminal 100 included in the stored AP-CO. Since the decryption of the digital signature DSpr succeeds in the case of FIG. 6, the AP 10 executes a second AP determination process that is regarding whether or not a specific value obtained by decrypting the digital signature DSpr is identical to a value obtained by hashing the respective kinds of information in the received printer-SC (that is, the hash value HV, the "Group", and the public key PPK2). In the case of FIG. 6, the AP 10 determines "identical" in the second AP determination process, thus it determines that the authentication of the respective kinds of information in the DReq succeeds, and executes processes from T404. The fact that the AP 10 determines "identical" in the second AP determination process means that the respective kinds of information in the received printer-SC (that is, the hash value HV, the "Group", and the public key PPK2) has not been tampered with by a third party since the printer-CO was stored in the printer 300. On the other hand, in a case where the AP 10 determines "not identical" in the first AP determination process, in a case where the decryption of the digital signature DSpr fails, or in a case where the AP 10 determines "not identical" in the second AP determination process, the AP 10 determines that the authentication fails and does not execute the processes from T404.

Next, in T404, the AP 10 generates a connection key CK (that is, a shared key) by using the obtained public key PPK2 of the printer 300 and the stored private key ask2 of the AP 10 according to the ECDH.

In T410, the AP 10 sends a DPP Peer Discovery Response (hereinafter abbreviated to "DRes") including the AP-SC to the printer 300.

In response to receiving the DRes from the AP 10 in T410, the printer 300 executes a process for authenticating the sender of the DRes (that is, the AP 10) and the respective information in the DRes (that is, the hash value HV, the "Group", and the public key APK2). Specifically, in T412, the printer 300 firstly executes a first PR determination process that is regarding whether or not the hash value HV and the group ID "Group" in the received AP-SC are respectively identical to the hash value HV and the group ID "Group" in the printer-SC included in the stored printer-CO. In the case of FIG. 6, the printer 300 determines "identical" in the first PR determination process, thus it determines that the authentication of the sender of the DRes (that is, the AP 10) succeeds. The fact that the hash value HV in the received AP-SC is identical to the hash value HV in the printer-SC included in the stored printer-CO means that the printer-SC and the AP-SC were generated by the same device (that is, the first terminal 100). As such, the printer 300 also determines that authentication of the creator of the received AP-SC (that is, the first terminal 100) succeeds.

Further, the printer 300 decrypts the digital signature DSap in the received AP-SC by using the public key TPK2 of the first terminal 100 included in the stored printer-CO. Since the decryption of the digital signature DSap succeeds in the case of FIG. 6, the printer 300 executes a second PR determination process that is regarding whether or not a specific value obtained by decrypting the digital signature DSpr is identical to a value obtained by hashing the respective information in the received AP-SC (that is, the hash value HV, the "Group", and the public key APK2). In the case of FIG. 6, the printer 300 determines "identical" in the second PR determination process, thus it determines that the authentication of the information in the DRes succeeds, and executes processes from T414. The fact that the printer 300 determines "identical" in the second PR determination process means that the respective information in the received AP-SC (that is, the hash value HV, the "Group", and the public key APK2) has not been tampered with by a third party since the AP-CO was stored in the AP 10. On the other hand, in a case where the printer 300 determines "not identical" in the first PR determination process, in a case where the decryption of the digital signature DSap fails, or in a case where the printer 300 determines "not identical" in the second PR determination process, the printer 300 determines that the authentication fails and does not execute the processes from T414.

In T414, the printer 300 generates a connection key CK by using the stored private key psk2 of the printer 300 and the public key APK2 of the AP 10 in the received AP-SC according to the ECDH. Here, the connection key CK generated by the AP 10 in T404 and the connection key CK generated by the printer 300 in T414 are identical to each other. Thus, the connection key CK for establishing the DPP connection is shared between the printer 300 and the AP 10.

As aforementioned, after the connection key CK is shared between the printer 300 and the AP 10, the printer 300 and the AP 10 execute the 4way-handshake communication by using the connection key CK in T420. As a result, the DPP connection is established between the printer 300 and the AP 10. A channel to be used in communication via this DPP connection is a channel which is one of 1ch to 13ch as determined by the AP 10. That is, this channel may be same as the aforementioned DPP channel as above, or may be different from the aforementioned DPP channel.

After this, the printer 300 shifts to a DPP non-respondent state (i.e. a state before T110 of FIG. 3) in T430. The DPP non-respondent state is a state not responding to any authentication request (i.e. AReq) using whichever channel. That is, the DPP non-respondent state is a state not standing by for the authentication request. When the process of T430 is completed, the process of FIG. 6 is terminated.

Figure 7:
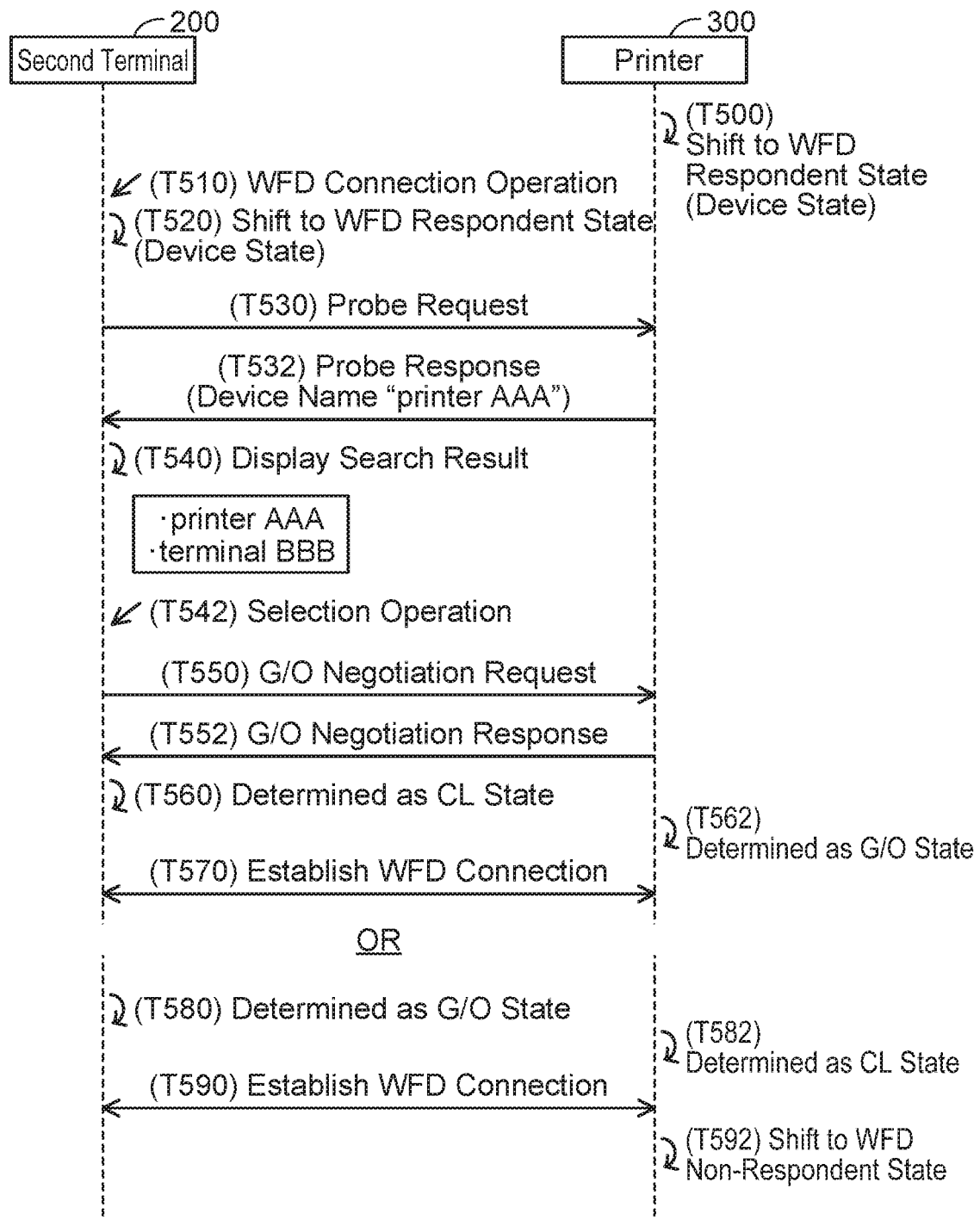
FIG. 7 shows a sequence diagram of a process for establishing a Wi-Fi connection according to a WFD scheme between the printer and a second terminal.

(Overview of WFD; FIG. 7)

Next, an overview of WFD will be described with reference to FIG. 7. As aforementioned, the second terminal 200 and the printer 300 support the WFD scheme, and the WFD connection is established between the second terminal 200 and the printer 300. All the communication as hereinafter executed between the second terminal 200 and the printer 300 is implemented via the Wi-Fi I/F 206 of the second terminal 200 and the Wi-Fi I/F 306 of the printer 300. Therefore, hereinafter, the description "via the Wi-Fi I/F 206 (or 306)" will be omitted.

In T500, the printer 300 shifts to a WFD respondent state, which is a device state in the WFD scheme. The WFD respondent state is a state being capable of responding to a Probe Request (hereinafter abbreviated to "PReq") that is sent from the second terminal 200. The PReq is a signal for searching for peripheral device(s) of the second terminal 200. Especially, the WFD respondent state of T500 is a state being capable of responding to the PReq using only one channel among 1ch, 6ch, and 11ch (hereinafter termed "Listen channel"). In other words, the WFD respondent state of T500 is a standby state for receiving the PReq using the Listen channel. That is, the printer 300 sends a Probe Response (hereinafter abbreviated to "PRes") in response to receiving the PReq using the Listen channel, but does not send the PRes in response to the PReq using a channel different from the Listen channel. Here, "not send the PRes in response to the PReq" includes not being capable of receiving the PReq as well as being capable of receiving the PReq but configured not to send the PRes even when the PReq is received. Hereinafter, the three channels, namely the 1ch, 6ch, and 11ch, will be termed "social channels".

In T510, the second terminal 200 accepts a WFD connection operation from the user. The WFD connection operation is, for example, a user operation to activate the application for the WFD connection installed in the second terminal 200. The second terminal 200 shifts to the WFD respondent state in T520 in response to accepting the WFD connection operation.

In T530, the second terminal 200 executes Search according to the WFD scheme. Specifically, the second terminal 200 sends the PReq by broadcast. Here, the second terminal 200 repeats to send the PReq by sequentially using the social channels (i.e., 1ch, 6ch, and 11ch).

When a channel in which the printer 300 stands by for the PReq and a channel used in sending of the PReq from the second terminal 200 match, the printer 300 receives the PReq from the second terminal 200 in T530. In this case, in T532, the printer 300 sends the PRes including a device name "printer AAA" of the printer 300 to the second terminal 200.

The second terminal 200 receives the PRes from the printer 300 in T532. Although omitted from the drawings, the second terminal 200 may also receive the PRes from other device(s). Then, in T540, the second terminal 200 displays a search result indicating one or more device names included in the one or more PRes received in T532. In the example of FIG. 7, the search result includes "printer AAA" and "terminal BBB".

In T542, the second terminal 200 accepts a user selection of "printer AAA" included in the search result displayed in T540. In this case, a G/O negotiation is executed between the second terminal 200 and the printer 300 in T550 and T552. The G/O negotiation is communication for determining which one of the second terminal 200 and the printer 300 is to be in the G/O state.

Specifically, the second terminal 200 sends a G/O Negotiation Request (hereinafter abbreviated to "GNReq") to the printer 300 in T550. The GNReq includes an Intent value of the second terminal 200. The Intent value is a value that is one of values ranging from 1 to 15, and represents a degree of facility of shifting to the G/O state.

The printer 300 receives the GNReq from the second terminal 200 in T550. In this case, the printer 300 sends a G/O Negotiation Response (hereinafter abbreviated to "GNRes") to the second terminal 200 in T552. The GNRes includes an Intent value of the printer 300.

After this, the second terminal 200 and the printer 300 respectively compare the Intent value of the second terminal 200 and the Intent value of the printer 300 and determine which one of them is to be in the G/O state. In a case where the Intent value of the printer 300 is greater than the Intent value of the second terminal 200, the second terminal 200 determines to be in the CL state in T560 and the printer 300 determines to be in the G/O state in T562. On the other hand, in a case where the Intent value of the printer 300 is smaller than the Intent value of the second terminal 200, the second terminal 200 determines to be in the G/O state in T580 and the printer 300 determines to be in the CL state in T582.

When the G/O negotiation is completed, respective types of communication such as Wi-Fi Protected Setup (WPS), Authentication, Association, and 4-way handshake, are executed between the second terminal 200 and the printer 300. As a result, in T570 or T590, a WFD connection is established between the second terminal 200 and the printer 300. A channel to be used in communication via the WFD connection is a channel which is one of 1ch to 13ch as determined by the device in the G/O state. That is, this channel may be same as the aforementioned Listen channel, or may be different from the aforementioned Listen channel.

After the WFD connection is established in T570, the printer 300 maintains the WFD respondent state which is the G/O state. Specifically, this WFD respondent state is a state being capable of responding to the PReq using only the channel used in the WFD connection established in T570 (i.e., the channel determined by the printer 300 being in the G/O state). That is, the WFD respondent state is a standby state for the PReq using the aforementioned channel.

On the other hand, after the WFD connection is established in T590, the printer 300 shifts to a WFD non-respondent state (i.e., a state before T500 of FIG. 7) in T592. This is because the printer 300 in the CL state cannot respond to the PReq. The WFD non-respondent state is a state not responding to any PReq using whichever channel. The process of FIG. 7 is terminated when the process of T570 or T592 is completed.

As aforementioned, the printer 300 is capable of shifting to the DPP respondent state (T110 of FIG. 3) as well as shifting to the WFD respondent state (T500 of FIG. 7). Further, the present embodiment assumes a situation in which the printer 300 shifts to the WFD respondent state when it has been maintaining the DPP respondent state. In such a situation, if the channel used in the DPP respondent state and the channel used in the WFD respondent state are different, the printer 300 stands by for the AReq or the PReq while sequentially switching these channels. In this case, the printer 300 cannot receive the AReq unless a period during which the printer 300 stands by for the AReq using a certain channel and a timing when the AReq using this certain channel is sent from the first terminal 100 match each other. Further, the printer 300 cannot receive the PReq unless a period during which the printer 300 stands by for the PReq using a certain channel and a timing when the PReq using this certain channel is sent from the second terminal 200 match each other. Due to this, some time may be required before the printer 300 receives the AReq or the PReq. To suppress such a situation from happening, the printer 300 executes the process of FIG. 8.

(State Shifting Process of Printer 300; FIG. 8)

A state shifting process executed by the CPU 322 of the printer 300 will be described with reference to FIG. 8. The CPU 322 obtains a power-ON instruction when a power button included in the operation unit 302 of the printer 300 is operated by the user in a state where power of the printer 300 is off. In this case, the CPU 322 initiates the process of FIG. 8.

In S100, the CPU 322 displays a QR Code on the display unit 304. Here, the memory 324 stores in advance, before when the printer 300 was shipped, the QR Code that includes the public key PPK1, the channel information indicating 1ch (i.e., the DPP channel) determined in advance from among the social channels (i.e., 1ch, 6ch, 11ch), and the MAC address "macpr". Further, the CPU 322 obtains the QR Code from the memory 324 and supplies this QR Code to the display unit 304, by which it causes the display unit 304 to display the QR Code.

In S102, the CPU 322 causes the state of the printer 300 to shift from the DPP non-respondent state to the DPP respondent state. Especially, the DPP respondent state in S102 is the state being capable of responding to the AReq using only 1ch being the DPP channel. By instructing the Wi-Fi I/F 306 that a shift to the DPP respondent state in which only 1ch is used, that is, a shift to the standby state for the AReq using 1ch should be executed, the CPU 322 causes the state of the printer 300 to shift to the DPP respondent state.

In S110, S120, S130, and S140, the CPU 322 monitors acquisition of various instructions. In a case where a DPP disabling button included in the operation unit 302, 304 of the printer 300 is operated by the user while the state of the printer 300 is the DPP respondent state, the CPU 322 determines as having obtained a DPP disabling instruction (YES to S110) and proceeds to S112.

In S112, the CPU 322 stops displaying the QR Code and causes the state of the printer 300 to shift from the DPP respondent state to the DPP non-respondent state. Specifically, the CPU 322 instructs the Wi-Fi I/F 306 to shift to the DPP non-respondent state, that is, to shift to the state of not standing by for the AReq. When the process of S112 is completed, the CPU 322 returns to monitoring such as in S110.

In a case where a DPP enabling button included in the operation unit 302, 304 of the printer 300 is operated by the user while the state of the printer 300 is the DPP non-respondent state, the CPU 322 determines that a DPP enabling instruction has been obtained (YES to S120) and executes S100 and S102.

In a case where a WFD enabling button included in the operation unit 302, 304 of the printer 300 is operated by the user while the state of the printer 300 is the WFD non-respondent state, the CPU 322 determines that a WFD enabling instruction has been obtained (YES to S130) and proceeds to S132.

In S132, the CPU 322 determines whether the state of the printer 300 is the DPP respondent state or the DPP non-respondent state. The CPU 322 proceeds to S134 in a case of determining that the state of the printer 300 is the DPP respondent state (YES to S132) and proceeds to S136 in a case of determining that the state of the printer 300 is the DPP non-respondent state (NO to S132).

In S134, the CPU 322 causes the state of the printer 300 to shift from the WFD non-respondent state to the WFD respondent state. Especially, the WFD respondent state in S134 is the device state in the WFD scheme, and is a state being capable of responding to the PReq using only 1ch (i.e., the Listen channel) that is same as the DPP channel used in the DPP respondent state. By instructing the Wi-Fi I/F 306 to shift to the WFD respondent state that uses 1ch only, that is, to shift to the standby state for the PReq using 1ch, the CPU 322 causes the state of the printer 300 to shift to the WFD respondent state. When the process of S134 is completed, the CPU 322 returns to the monitoring such as in S110.

In S136, the CPU 322 selects one channel (i.e., the Listen channel) to be used in the WFD respondent state from among the social channels (i.e., 1ch, 6ch, and 11ch). Specifically, the CPU 322 firstly sends the PReq using 1ch by broadcast, and counts a number of the PRes received in response to this PReq. Similarly, the CPU 322 sends the PReq and counts the number of the PRes for 6ch and 11ch as well. Then, the CPU 322 selects a channel among the social channels with a smallest number of the counted PRes, that is, a channel that is currently least used around the printer 300, as the Listen channel.

In S138, the CPU 322 causes the state of the printer 300 to shift from the WFD non-respondent state to the WFD respondent state. Especially, the WFD respondent state in S138 is the device state in the WFD scheme, and is a state being capable of responding to the PReq using only the channel selected in S136 (i.e., the Listen channel). By instructing the Wi-Fi I/F 306 to shift to the WFD respondent state using the selected channel only, that is, to shift to the standby state for the PReq using the selected channel, the CPU 322 causes the state of the printer 300 to shift to the WFD respondent state. When the process of S138 is completed, the CPU 322 returns to the monitoring such as in S110.

In a case where a WFD disabling button included in the operation unit 302, 304 of the printer 300 is operated by the user, the CPU 322 determines that a WFD disabling instruction has been obtained (YES to S140) and proceeds to S142.

In S142, the CPU 322 causes the state of the printer 300 to shift from the WFD respondent state to the WFD non-respondent state. Specifically, the CPU 322 instructs the Wi-Fi I/F 306 to shift to the WFD non-respondent state, that is, to a state not standing by for the PReq. When the process of S142 is completed, the CPU 322 returns to the monitoring such as in S110.

Figure 9:
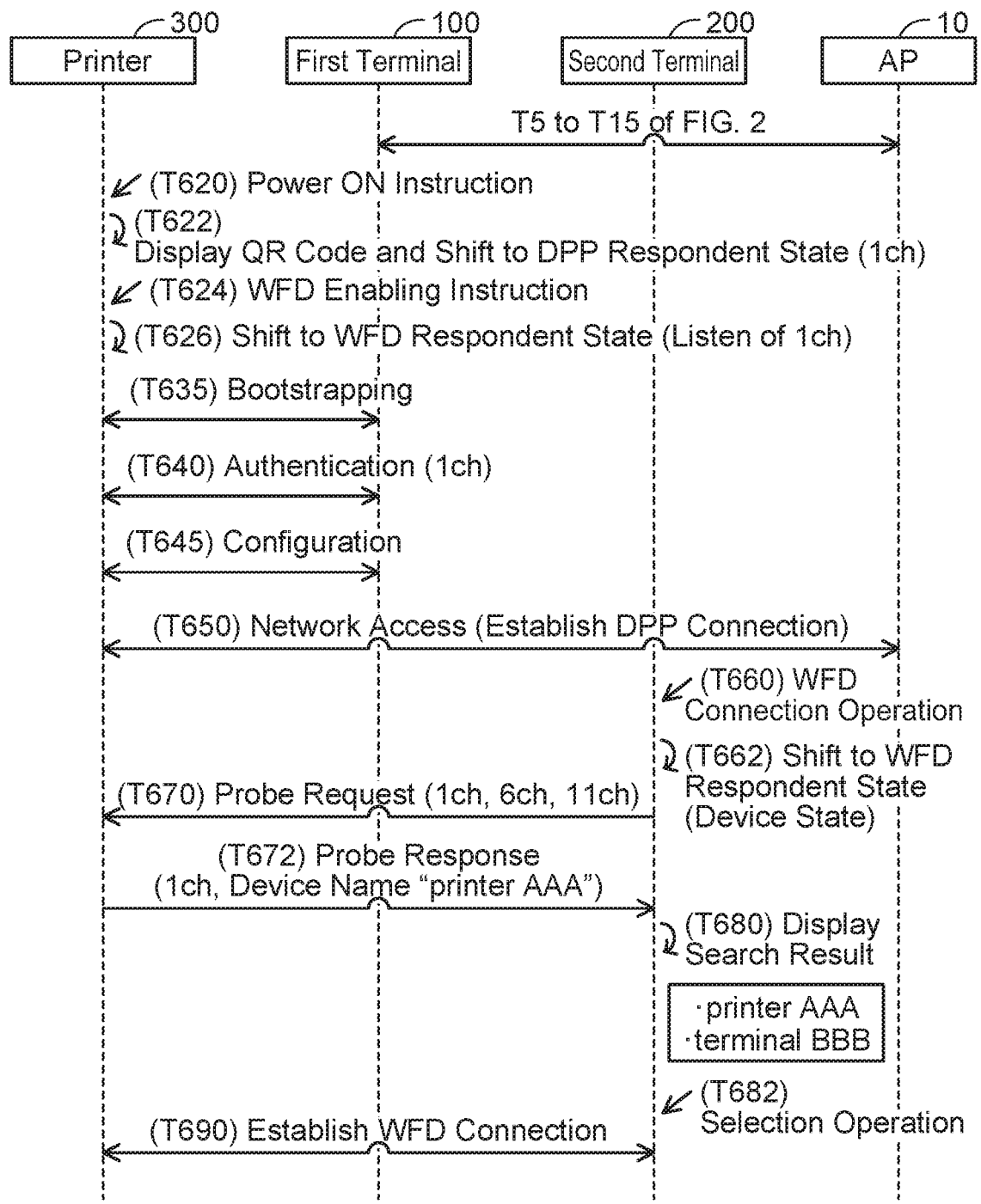
FIG. 9 shows a sequence diagram of Case A in which the printer shifts to a WFD respondent state in a situation of having been in a DPP respondent state.

(Case A; FIG. 9)

Next, specific cases realized by the process of FIG. 8 will be described. Firstly, Case A in which the printer 300 shifts to the WFD respondent state in a situation of having been in the DPP respondent state will be described with reference to FIG. 9. The BS, Auth, and Config of the DPP scheme are executed between the first terminal 100 and the AP 10. These processes are similar to those of T5 to T15 of FIG. 2.

When the printer 300 obtains the power-ON instruction (trigger for the process of FIG. 8) in T620, the printer 300 displays the QR Code (S100) in T622 and shifts to the DPP respondent state (S102). Especially, the DPP respondent state in T622 is the state being capable of responding to the AReq using only 1ch being the DPP channel.

When the WFD enabling instruction is obtained in T624 (YES to S130), the printer 300 shifts to the WFD respondent state (YES to S132, S134). The WFD respondent state of T626 is a state being capable of responding to the PReq using only 1ch being the same Listen channel as the DPP channel.

T635 to T650 are similar to T25 to T40 of FIG. 2 except that 1ch is used as the DPP channel in the Auth process between the printer 300 and the first terminal 100. Thus, the DPP connection is established between the printer 300 and the AP 10.

The processes of T660 to T670 are similar to the processes of T510 to T530 of FIG. 7. When the PReq using 1ch is received from the second terminal 200 in T670, the printer 300 sends the PRes using 1ch to the second terminal 200 in T672.

The processes of T680 and T682 are similar to the processes of T540 and T542 of FIG. 7. After this, the G/O negotiation is executed between the printer 300 and the second terminal 200 (omitted from FIG. 9, see T550 and T552 of FIG. 7), and then in T690, the WFD connection is established between the printer 300 and the second terminal 200.

As shown in Case A above, in the case of obtaining the WFD enabling instruction (T624) while being in the DPP respondent state being capable of responding to the AReq using 1ch being the DPP channel, the printer 300 shifts to the state being capable of responding to the AReq using 1ch and also capable of responding to the PReq using 1ch (T626). Thus, the printer 300 can stand by for the AReq and the PReq in a same channel. According to this, the printer 300 can promptly receive the AReq and the PReq in T640 and T670 as compared to a configuration in which the channel used in the DPP respondent state and the channel used in the WFD respondent state are different. As such, according to the present embodiment, the printer 300 can shift to the state of standing by for signals using a suitable channel.

Further, in the present embodiment, the printer 300 uses 1ch that is determined in advance as the DPP channel. That is, the printer 300 fixes the DPP channel used in the DPP respondent state to 1ch. Due to this, the vendor of the printer 300 can store in advance the QR Code displayed in T622 (i.e., the QR Code including the channel information indicating 1ch) in the memory 324. As a result of this, the printer 300 can display the prestored QR Code in T622. As such, the printer 300 does not have to execute the process of generating the QR Code, which enables it to display the QR Code promptly.

Figure 10:
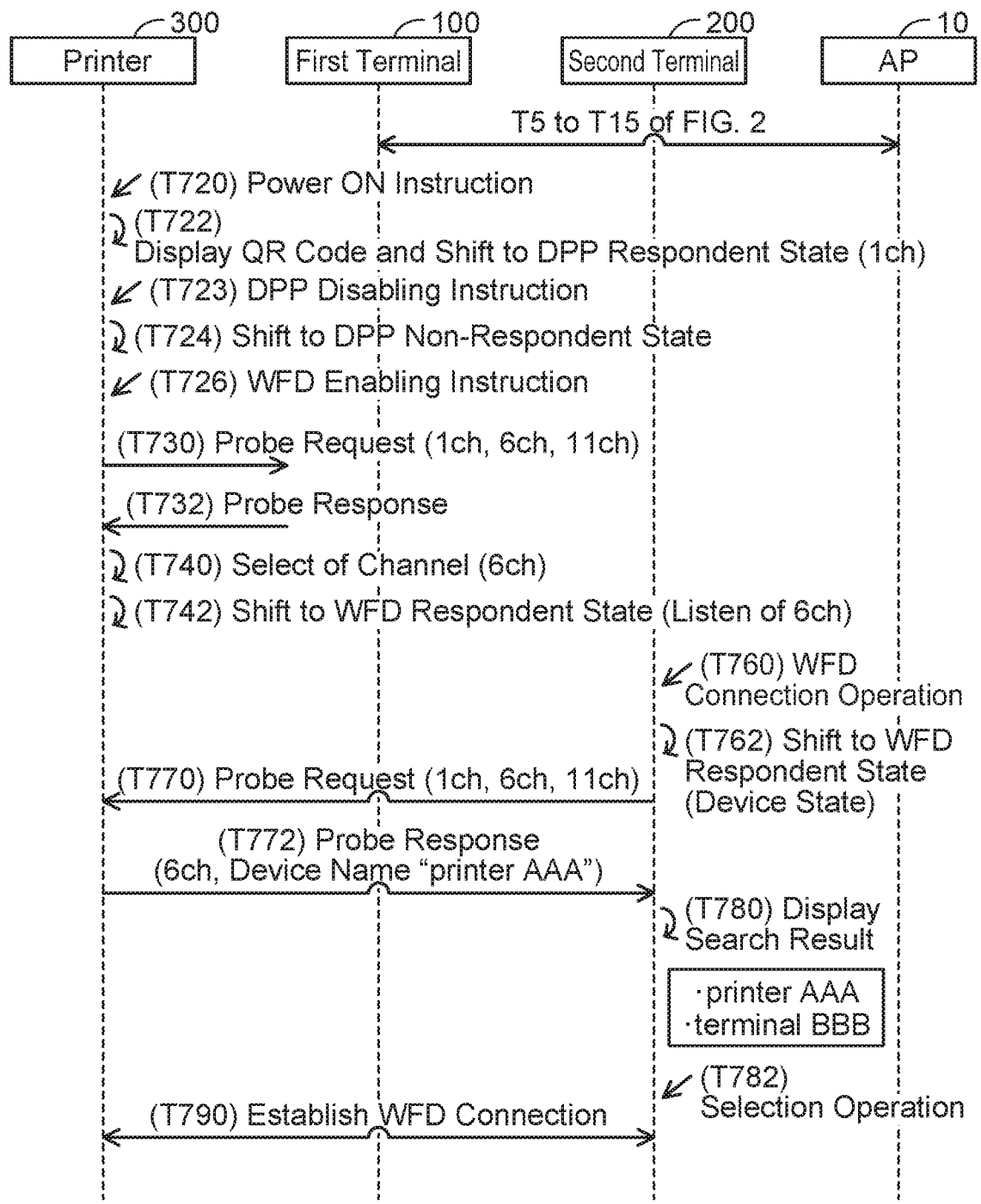
FIG. 10 shows a sequence diagram of Case B in which the printer shifts to the WFD respondent state in a situation of having been in a DPP non-respondent state.

(Case B; FIG. 10)

Next, Case B in which the printer 300 shifts to the WFD respondent state in a situation of having been in the DPP non-respondent state will be described with reference to FIG. 10.

The processes of T720 and T722 are similar to the processes of T620 and T622 of FIG. 9. When the DPP disabling instruction is obtained in T723 (YES to S110 of FIG. 8), the printer 300 shifts to the DPP non-respondent state in T724 (S112).

When the WFD enabling instruction is obtained in T726 (YES to S130, NO to S132), the printer 300 sends the PReq by broadcast by sequentially using the social channels (i.e., 1ch, 6ch, 11ch) in T730 (S136). Then, in T732, the printer 300 receives the PRes in each channel and counts the number of the PRes in each channel. In the case of FIG. 10, the number of the PRes is smallest in 6ch, thus the printer 300 selects 6ch as the Listen channel in T740 (S136).

In T742, the printer 300 shifts to the WFD respondent state (S138). The WFD respondent state of T742 is a state being capable of responding to the PReq using only 6ch selected in T740. The processes of T760 to T770 are similar to the processes of T510 to T530 of FIG. 7. When the PReq using 6ch is received from the second terminal 200 in T770, the printer 300 sends the PRes using 6ch to the second terminal 200 in T772. The processes of T780 to T790 are similar to the processes of T680 to T690 of FIG. 9.

As indicated in Case B above, in the case of obtaining the WFD enabling instruction (T726) while being in the DPP non-respondent state, the printer 300 selects the currently least used channel around the printer 300 from among the social channels (T730 to T740) and shifts to the WFD respondent state being capable of responding to the PReq using only the selected channel (T742). Due to this, the printer 300 can suitably receive the PReq from the second terminal 200 as compared to a configuration of using a channel that is used frequently around the printer 300.

(Corresponding Relationship)

The printer 300 is an example of a "communication device". The first terminal 100, the AP 10, and the second terminal 200 are respectively an example of a "terminal device", a "first external device", and a "second external device". The display unit 304 and the Wi-Fi I/F 306 are respectively an example of an "output unit" and a "wireless interface". The QR Code and 1ch, are respectively an example of "output-information" and a "target channel". The DPP scheme and the WFD scheme are respectively an example of a "first scheme" and a "second scheme". The Wi-Fi connection established in T650 and the Wi-Fi connection established in T690 of FIG. 9 are respectively an example of a "first wireless connection" and a "second wireless connection". The AReq, the ARes, the PReq, and the PRes are respectively an example of an "authentication request", an "authentication response", a "search signal", and a "search response".

The power-OFF state of the printer 300 (i.e., being in the DPP non-respondent state and the WFD non-respondent state) is an example of a "first state". Being in the DPP respondent state and the WFD non-respondent state (the state in T622 of FIG. 9) is an example of a "second state". Being in the DPP respondent state and the WFD respondent state (the state in T626 of FIG. 9) is an example of a "third state". Being in the DPP non-respondent state and the WFD respondent state (the state in T742 of FIG. 10) is an example of a "fourth state". The power-ON instruction and the WFD enabling instruction are respectively an example of a "first instruction" and a "second instruction".

The process of S100, the process of S102, the process of S134, the process of S136, and the process of S138 of FIG. 8 are respectively an example of "executing an output control process", "shifting the state of the communication device from the first state to a second state", "shifting the state of the communication device from the second state to a third state", "selecting one channel", and "shifting the state of the communication device from the first state to a fourth state". The process of T220 of FIG. 4 and the process of T532 of FIG. 7 are respectively an example of "sending an authentication response" and "sending a search response". The process of T650 and the process of T690 of FIG. 9 are respectively an example of "establishing a first wireless connection" and "establishing a second wireless connection".

Second Embodiment

Next, a second embodiment will be described. In the present embodiment, a situation in which the printer 300 shifts to the DPP respondent state while being in the WFD respondent state will be assumed.

Figure 11:
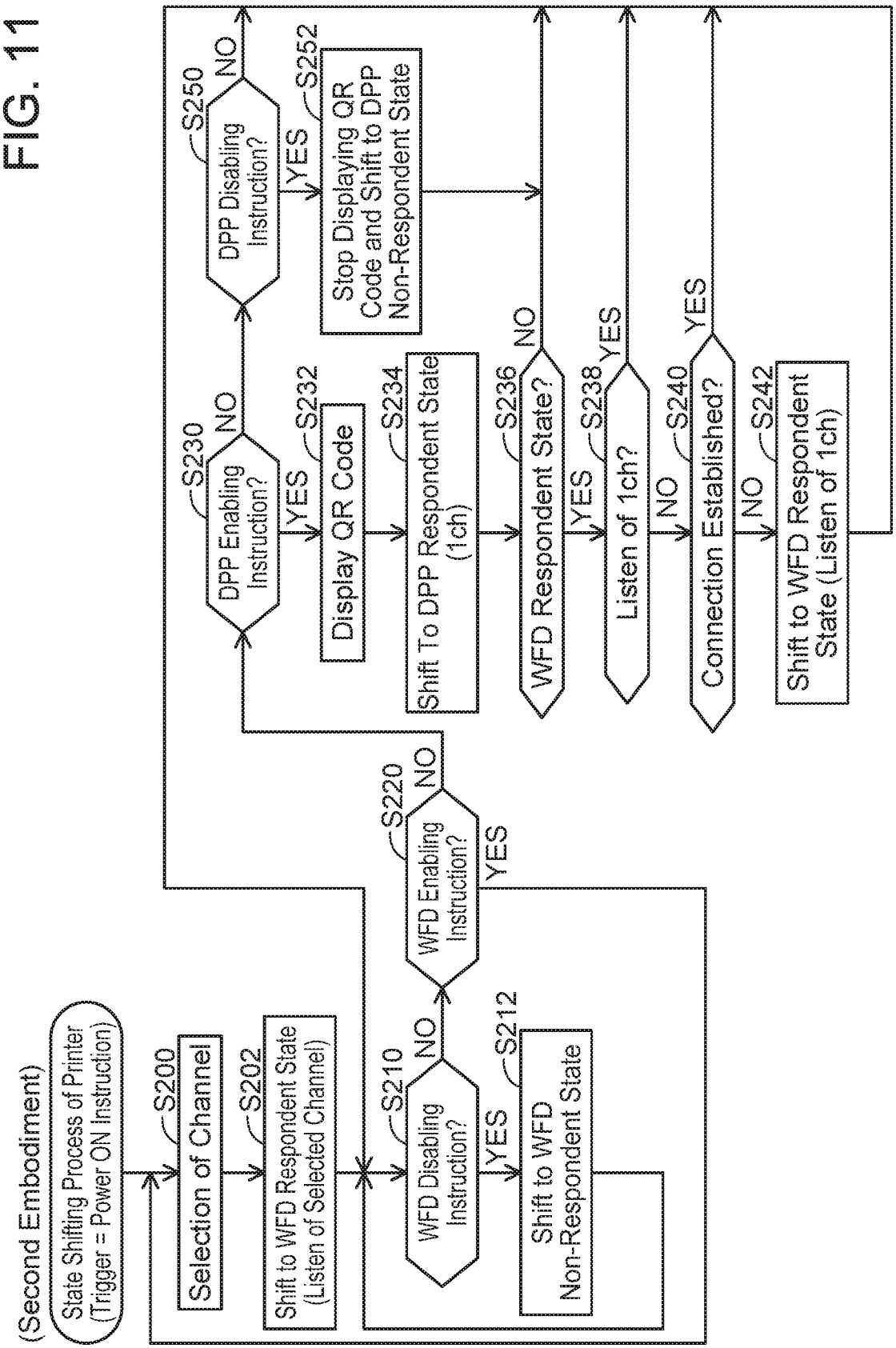
FIG. 11 shows a flowchart of a state shifting process of a second embodiment.

(State Shifting Process of Printer 300; FIG. 11)

In the present embodiment, the process of FIG. 11 is executed instead of the process of FIG. 8. The CPU 322 obtains the power-ON instruction when the power button included in the operation unit 302, 304 of the printer 300 is operated by the user in the state where power of the printer 300 is off. In this case, the CPU 322 initiates the process of FIG. 11.

S200 and S202 are similar to S136 and S138 of FIG. 8. That is, in the present embodiment, the CPU 322 shifts to the WFD respondent state instead of shifting to the DPP respondent state in the case of obtaining the power-ON instruction.

In S210, S220, S230, and S250, the CPU 322 monitors acquisition of various instructions. In the case where the WFD disabling button included in the operation unit 302, 304 of the printer 300 is selected by the user while the state of the printer 300 is the WFD respondent state, the CPU 322 determines that the WFD disabling instruction has been obtained (YES to S210) and proceeds to S212. S212 is similar to S142 of FIG. 8. When the process of S212 is completed, the CPU 322 returns to monitoring such as in S210.

In the case where the WFD enabling button included in the operation unit 302, 304 of the printer 300 is operated by the user while the state of the printer 300 is the WFD non-respondent state, the CPU 322 determines that the WFD enabling instruction has been obtained (YES to S220) and executes S200 and S202.

In a case where the DPP enabling button included in the operation unit 302, 304 of the printer 300 is operated by the user while the state of the printer 300 is the DPP non-respondent state, the CPU 322 determines that the DPP enabling instruction has been obtained (YES to S230) and proceeds to S232. S232 and S234 are similar to S100 and S102 of FIG. 8.

In S236, the CPU 322 determines whether the state of the printer 300 is the WFD respondent state or the WFD non-respondent state. A case in which the state of the printer 300 is the WFD respondent state is either a case where the printer 300 is in the device state of the WFD scheme or a case where the printer 300 is in the G/O state of the WFD scheme. The CPU 322 proceeds to S238 in a case of determining that the state of the printer 300 is the WFD respondent state (i.e., the device state or G/O state) (YES to S236), while the CPU 322 returns to the monitoring such as in S210 in a case of determining that the state of the printer 300 is the WFD non-respondent state (i.e., the CL state of the WFD scheme or a state in which communication according to the WFD scheme is disabled (see YES to S210)) (NO to S236).

In S238, the CPU 322 determines whether or not the Listen channel currently used in the WFD respondent state of the printer 300 matches 1ch, which is the DPP channel. The CPU 322 proceeds to S240 in a case of determining that the Listen channel does not match 1ch (NO to S238) while the CPU 322 returns to the monitoring such as in S210 in a case of determining that the Listen channel matches 1ch (YES to S238).

In S240, the CPU 322 determines whether or not a WFD connection is established between the printer 300 and another device (such as the second terminal 200). The CPU 322 proceeds to S242 in a case of determining that no WFD connection is established between the printer 300 and another device (NO to S240) while the CPU 322 returns to the monitoring such as in S210 in a case of determining that the WFD connection is established between the printer 300 and another device (YES to S240).

In S242, the CPU 322 causes the state of the printer 300 to shift from the current WFD respondent state to a new WFD respondent state. The new WFD respondent state is a state being capable of responding to the PReq using only 1ch. That is, the CPU 322 changes the Listen channel to 1ch. When the process of S242 is completed, the CPU 322 returns to the monitoring such as in S210.

When the DPP disabling button included in the operation unit 302, 304 of the printer 300 is operated by the user, the CPU 322 determines that the DPP disabling instruction has been obtained (YES to S250) and proceeds to S252. S252 is similar to S112 of FIG. 8. When the process of S252 is completed, the CPU 322 returns to the monitoring such as in S210.

Figure 12:
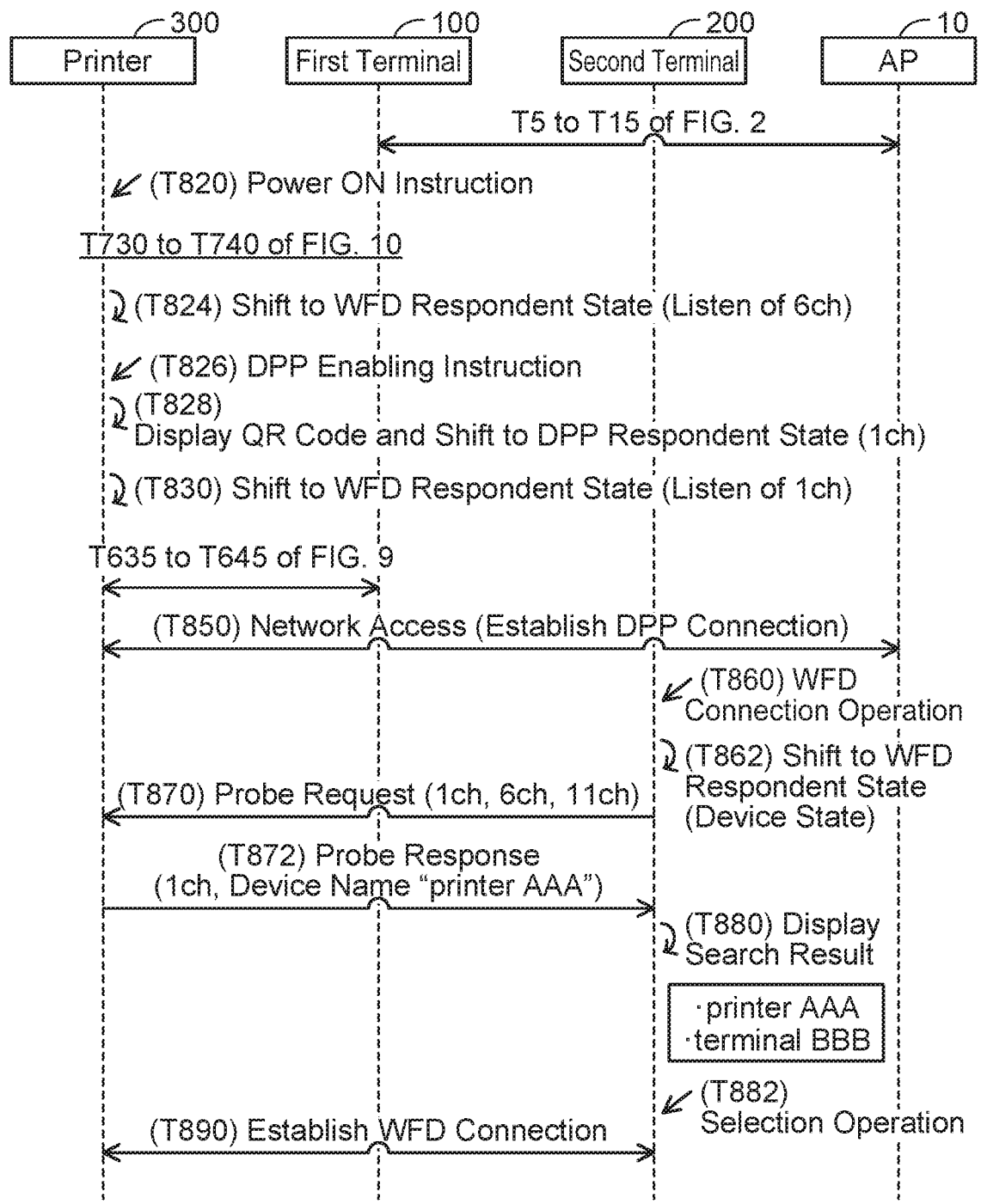
FIG. 12 shows a sequence diagram of Case C in which the printer shifts to the DPP respondent state in a situation of having been in the WFD respondent state being a device state.

(Case C; FIG. 12)

Next, specific cases realized by the process of FIG. 11 will be described. Firstly, Case C in which the printer 300 shifts to the DPP respondent state in a situation of having been in the WFD respondent state being the device state will be described with reference to FIG. 12.

When the printer 300 obtains the power-ON instruction in T820 (trigger for the process of FIG. 11), the printer 300 executes processes similar to T730 to T740 of FIG. 10 and selects 6ch in the present case (S200). Then, in T824, the printer 300 shifts to the WFD respondent state (S202). The WFD respondent state of T824 is a state being capable of responding to the PReq using only 6ch, which have selected the Listen channel.

When the DPP enabling instruction is obtained in T826 (YES to S230), the printer 300 displays the QR Code (S232) in T828 and shifts to the DPP respondent state (S234). Especially, the DPP respondent state in T828 is the state being capable of responding to the AReq using only 1ch being the DPP channel.

In T830, the printer 300 shifts from the WFD respondent state in which 6ch is used (see T824) to the WFD respondent state in which 1ch is used (YES to S236, NO to S238, NO to S240, and S242). That is, the printer 300 changes the Listen channel from 6ch to 1ch. The WFD respondent state of T830 is a device state of the WFD scheme.

When the BS, Auth, and Config of the DPP scheme are executed between the printer 300 and the first terminal 100 after the printer 300 has shifted to the WFD respondent state, the DPP connection is established between the printer 300 and the AP 10 in T850. These processes are similar to T635 to T650 of FIG. 9.

The processes of T860 to T890 are similar to T660 to T690 of FIG. 9. Thus, the WFD connection is established between the printer 300 and the second terminal 200.

As indicated in Case C above, in the case of obtaining the DPP enabling instruction (T826) while being in the WFD respondent state being capable of responding to the PReq using 6ch, the printer 300 shifts to the state being capable of responding to the AReq using 1ch and also capable of responding to the PReq using 1ch (T828 and T830). Thus, the printer 300 can stand by for the AReq and the PReq in the same channel. According to this, the printer 300 can promptly receive the AReq and the PReq. As such, according to the present embodiment, the printer 300 can shift to the state of standing by for signals using a suitable channel.

Figure 13:
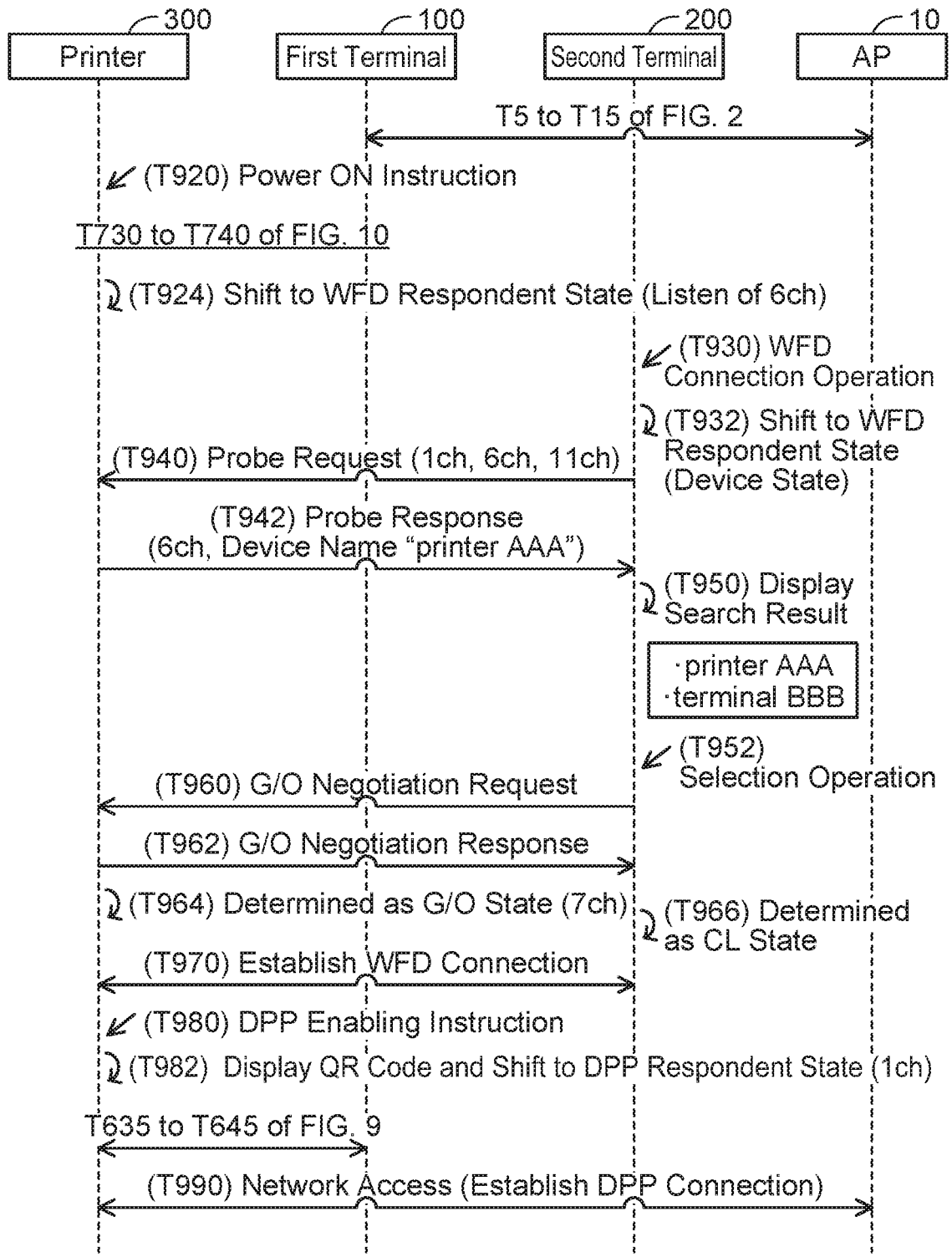
FIG. 13 shows a sequence diagram of Case D in which the printer shifts to the DPP respondent state in a situation of having been in the WFD respondent state being a Group Owner state and a WFD connection with another device being established.

(Case D; FIG. 13)

Next, Case D in which the printer 300 shifts to the DPP respondent state in a situation of having been in the WFD respondent state being the G/O state and the WFD connection with another device having been established will be described with reference to FIG. 13.

The processes of T920 to T924 are similar to the processes of T820 to T824 of FIG. 12 (S200 and S202 of FIG. 11). Further, the processes of T930 to T952 are similar to the processes of T860 to T882 of FIG. 12. However, since the printer 300 is in the WFD respondent state in which 6ch is used, it sends the PRes in T942 in response to the PReq using 6ch. T960 to T970 are similar to T550 to T570 of FIG. 7. In the present case, after having determined to enter the G/O state, the printer 300 selects a channel to be used while the printer 300 is in the G/O state from among 1ch to 13ch as the new Listen channel. Specifically, the printer 300 sequentially sends multiple PReq using each one of 1ch to 13ch by broadcast, and counts the number of the PRes for each channel. Then, the printer 300 selects a channel among 1ch to 13ch with the smallest number of the counted PRes, that is, a channel that is currently least used around the printer 300, as the Listen channel. In the case of FIG. 13, the printer 300 selects 7ch as the new Listen channel. In this state, the printer 300 is capable of responding to the PReq using 7ch.

The processes of T980 and T982 are similar to the processes of T826 and T828 of FIG. 12 (YES to S230, S232, and S234). In this case, the printer 300 determines that the Listen channel (i.e., 7ch) and the DPP channel (i.e., 1ch) are different (NO to S238), determines that the WFD connection with the second terminal 200 is established (YES to S240), and maintains the Listen channel as 7ch. That is, in T982, the printer 300 shifts to the DPP respondent state in which 1ch is used and the WFD respondent state in which 7ch is used. In this case, the printer 300 alternately repeats execution of the process of standing by for the AReq using 1ch and the process of standing by for the PReq using 7ch.

After this, when the BS, Auth, and Config of the DPP scheme are executed between the printer 300 and the first terminal 100, the DPP connection is established between the printer 300 and the AP 10 in T990. These processes are similar to the processes of T635 to T650 of FIG. 9.

As shown in Case D above, in the case where 7ch used in the WFD respondent state and 1ch used in the DPP respondent state are different and the WFD connection is established with the second terminal 200, the printer 300 maintains the Listen channel as 7ch. This is because if the Listen channel is changed from 7ch to 1ch, the WFD connection with the second terminal 200 would be disconnected. According to the present embodiment, the printer 300 can suppress the WFD connection with the second terminal 200 from disconnecting.

Figure 14:
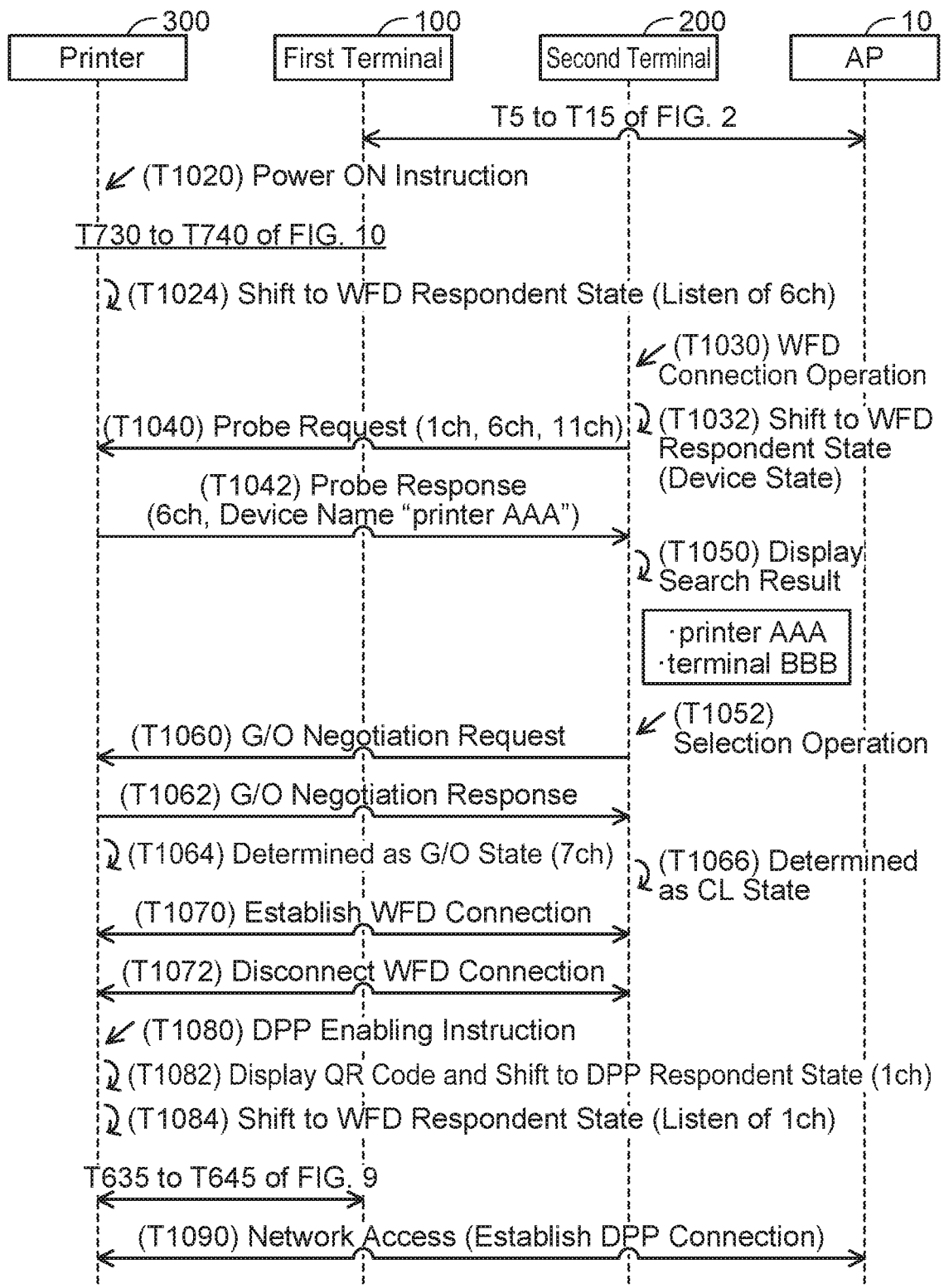
FIG. 14 shows a sequence diagram of Case E in which the printer shifts to the DPP respondent state in a situation of having been in the WFD respondent state being the Group Owner state and a WFD connection with another device being not established.

(Case E; FIG. 14)

Next, Case E in which the printer 300 shifts to the DPP respondent state in a situation of having been in the WFD respondent state being the G/O state and no WFD connection having been established with another device will be described with reference to FIG. 14.

The processes of T1020 to T1070 are similar to the processes of T920 to T970 of FIG. 13. After this, in T1072, the WFD connection between the printer 300 and the second terminal 200 is disconnected. For example, the WFD connection is disconnected when the second terminal 200 moves to a location away from the printer 300. Even though the WFD connection with the second terminal 200 has been disconnected, the printer 300 maintains the G/O state until a predetermined time elapses. This is because there is a possibility that the second terminal 200 may come back close to the printer 300 and re-establish the WFD connection with the printer 300.

The processes of T1080 and T1082 are similar to the processes of T980 and T982 of FIG. 13. In this case, the printer 300 determines that the Listen channel (i.e., 7ch) and the DPP channel (i.e., 1ch) are different (NO to S238), and since no WFD connection with another device is established (NO to S240), the printer 300 changes the Listen channel from 7ch to 1ch in T1084 (S242).

After this, when the BS, Auth, and Config of the DPP scheme are executed between the printer 300 and the first terminal 100, the DPP connection is established between the printer 300 and the AP 10 in T1090. These processes are similar to the processes of T635 to T650 of FIG. 9.

As shown in Case E above, in the case where 7ch used in the WFD respondent state and 1ch used in the DPP respondent state are different and no WFD connection is established with another device, the printer 300 changes the Listen channel from 7ch to 1ch. Thus, the printer 300 can stand by for the AReq and the PReq in the same channel. Due to this, the printer 300 can promptly receive the AReq and the PReq.

(Corresponding Relationship)

The 6ch channel selected in S200 of FIG. 11 or 7ch determined in T1064 of FIG. 14 is an example of a "first channel". Further, the DPP channel (i.e., 1ch) is an example of a "second channel". The power-OFF state of the printer 300 (i.e., being in the DPP non-respondent state and the WFD non-respondent state) is an example of the "first state". Being in the DPP non-respondent state and the WFD respondent state (the state of T824 of FIG. 12, the state of T924 of FIG. 13, or the state of T1024 of FIG. 14) is an example of the "second state". Being in the DPP respondent state and the WFD respondent state in which the same channel is used (the state of T830 of FIG. 12 or the state of T1084 of FIG. 14) is an example of the "third state". The DPP enabling instruction and the power-ON instruction are respectively an example of the "first instruction" and the "second instruction".

The process of S200, the process of S202, the process of S232, and the process of S234 of FIG. 11 are respectively an example of "selecting the first channel", "shifting the state of the communication device from the first state to a second state", "executing an output control process", and "shifting the state of the communication device from the second state to a third state". The process of T850 and the process of T890 of FIG. 12 are respectively an example of "establishing a first wireless connection" and "establishing a second wireless connection".

(Variant 1) In S100 of FIG. 8, the printer 300 may cause the print executing unit 308 to execute printing of the QR Code instead of displaying the QR Code. In this variant, the print executing unit 308 is an example of the "output unit" and a process of causing the print executing unit 308 to execute printing of the QR Code is an example of the "output control process".

(Variant 2) Each of the printer 300 and the first terminal 100 may further include a wireless interface (e.g., Bluetooth (Registered Trademark, BLUETOOTH SIG, INC.) (BT) I/F or Near Field Communication (NFC) I/F) according to a wireless scheme different from the Wi-Fi scheme (e.g., BT scheme or an NFC scheme). In this case, in S100 of FIG. 8, the printer 300 may for example instruct the BT I/F of the printer 300 to send the DPP information including the public key PPK1, the channel information, and the MAC address. In this case, the first terminal 100 can receive the DPP information via the BT I/F of the first terminal 100. In this variant, the BT I/F is an example of the "output unit" and instructing the BT I/F to send the DPP information is an example of the "output control process". Further, in another variant, the printer 300 may cause the NFC I/F of the printer 300 to store the DPP information in S100 of FIG. 8. In this case, the first terminal 100 can receive the DPP information via the NFC I/F of the first terminal 100. In this variant, the NFC I/F is an example of the "output unit" and causing the NFC I/F to store the DPP information is an example of the "output control process".

(Variant 3) The trigger of the process of FIG. 8 may not be the acquisition of the power-ON instruction, and may be acquisition of the DPP enabling instruction. In this variant, the DPP enabling instruction is an example of the "first instruction". Further, in another variant, the trigger of the process of FIG. 11 may not be the acquisition of the power-ON instruction, and may be acquisition of the WFD enabling instruction. In this variant, the WFD enabling instruction is an example of the "second instruction".

(Variant 4) In each of the embodiments as above, the DPP channel is fixed to 1ch. Instead of this, the printer 300 may determine the DPP channel by randomly selecting one channel from among the social channels (i.e., 1ch, 6ch, 11ch). In general terms, the "target channel" and the "second channel" may not be determined in advance from among the plurality of channels.

(Variant 5) In each of the above embodiments, the channel that is currently least used around the printer 300 is selected in S136 of FIG. 8 or S200 of FIG. 11. Instead of this, the printer 300 may randomly select one channel from among the social channels (i.e., 1ch, 6ch, 11ch) in S136 of FIG. 8 or S200 of FIG. 11. In general terms, the "selecting one channel (or selecting the first channel)" simply needs to select one channel from among the plurality of channels.

(Variant 6) S136 of FIG. 8 or S200 of FIG. 11 may be omitted, and the printer 300 may shift to the WFD respondent state in which only the channel determined in advance (such as 6ch) is used in S138 of FIG. 8 or S202 of FIG. 11. In this variant, the "selecting one channel (or selecting the first channel)" may be omitted.

(Variant 7) The printer 300 may not execute the G/O negotiation of the WFD scheme, and for example, in the case of obtaining the WFD enabling instruction in T624 of FIG. 9, it may autonomously shift to the G/O state. In this case as well, the printer 300 simply needs to shift to the WFD respondent state in which only 1ch is used.

(Variant 8) The printer 300 may not support the WFD scheme, and may support a so-called SoftAP scheme. That is, for example, the printer 300 may operate as a SoftAP in a case of obtaining a SoftAP enabling instruction in T624 of FIG. 9. In this case as well, the printer 300 may simply shift to a SoftAP respondent state in which only 1ch is used (i.e., the state being capable of responding to the PReq using only 1ch). In this variant, the SoftAP scheme is an example of the "first scheme". The G/O state of the WFD scheme and a state of operating as the SoftAP of the SoftAP scheme may collectively be expressed as a "parent station state".

(Variant 9) The printer 300 may not support the DPP scheme, and may support another scheme for establishing the Wi-Fi connection by using the public key, the authentication request, and the authentication response. In general terms, the "first scheme" may not be limited to the DPP scheme.

(Variant 10) In each of the above embodiments, the DPP connection between the printer 300 and the AP 10 is established using the first terminal 100. Instead of this, the DPP connection between the printer 300 and the first terminal 100 may be established using the first terminal 100. That is, NA of T40 may be executed between the printer 300 and the first terminal 100. In general terms, the "first external device" may be a device (such as the AP 10) different from the "terminal device (such as the first terminal 100)" as in each of the above embodiments, or may be a device that is identical to the "terminal device" as in this variant.

(Variant 11) The "communication device" may not be the printer 300, but may be another device such as a scanner, a multi-function peripheral, a portable terminal, a PC, and a server.

(Variant 12) In the above embodiments, the respective processes of FIGS. 2 to 14 are executed by software (such as the program 326), however, at least one of these processes may be realized by hardware such as a logic circuit.

What is claimed is:

1. A communication device comprising:
a wireless interface configured to execute wireless communication according to Wi-Fi standard;
an output unit; and
a controller configured to:
execute a process for establishing a wireless connection between the communication device and another device via the wireless interface according to a first scheme of the Wi-Fi standard; and
execute a process for establishing a wireless connection between the communication device and another device via the wireless interface according to a second scheme of the Wi-Fi standard, the second scheme being different from the first scheme,
wherein in a case where a first instruction for enabling communication according to the first scheme is obtained while a state of the communication device is a first state, the process for establishing the wireless connection according to the first scheme includes:
executing an output control process for causing the output unit to externally output output-information according to the first scheme, the output-information being information obtained by using channel information indicating a target channel and a public key of the communication device, the target channel being one of a plurality of channels which the wireless interface is capable of using; and
shifting the state of the communication device from the first state to a second state, the first state being a state in which the communication device does not respond to an authentication request according to the first scheme and does not respond to a search signal according to the second scheme, the second state being a state in which the communication device is capable of responding to the authentication request using only the target channel among the plurality of channels and does not respond to the search signal,
wherein in a case where a second instruction for enabling a communication according to the second scheme is obtained while the state of the communication device is the second state, the process for establishing the wireless connection according to the second scheme includes:
shifting the state of the communication device from the second state to a third state, the third state being a state in which the communication device is capable of responding to the authentication request using only the target channel among the plurality of channels and is capable of responding to the search signal using only the target channel among the plurality of channels.

2. The communication device as in claim 1, wherein the target channel is one channel that is determined in advance among the plurality of channels.

3. The communication device as in claim 1, wherein the process for establishing the wireless connection according to the first scheme further includes:
in a case where the second instruction is obtained while the state of the communication device is the first state:
selecting one channel among the plurality of channels; and
shifting the state of the communication device from the first state to a fourth state, the fourth state being a state in which the communication device does not respond to the authentication request and is capable of responding to the search signal using only the selected one channel among the plurality of channels.

4. The communication device as in claim 3, wherein the one channel is a channel which is currently least used around the communication device.

5. The communication device as in claim 1, wherein the first instruction is obtained by a power button of the communication device being operated in a state in which power of the communication device is off, and the second instruction is obtained by a predetermined button of the communication device different from the power button being operated after the power of the communication device has been turned on.

6. The communication device as in claim 1, wherein the process for establishing the wireless connection according to the first scheme further includes:
sending an authentication response to a terminal device via the wireless interface in a case where the authentication request using the target channel and the public key is received from the terminal device via the wireless interface while the state of the communication device is the second state or the third state after the channel information and the public key have been obtained by the terminal device in response to the output-information having been externally outputted; and in a case where the authentication response is sent, establishing a first wireless connection between the communication device and a first external device via the wireless interface, wherein the process for establishing the wireless connection according to the second scheme further includes:

sending a search response to a second external device via the wireless interface in a case where the search signal using the target channel is received from the second external device via the wireless interface while the state of the communication device is the third state; and in a case where the search response is sent, establishing a second wireless connection between the communication device and the second external device via the wireless interface.

7. The communication device as in claim 1, wherein the first scheme is a Device Provisioning Protocol scheme.

8. The communication device as in claim 1, wherein the second scheme is a Wi-Fi Direct scheme.

9. The communication device as in claim 1, wherein
the output unit is a display unit,
the output-information is a code image obtained by coding the channel information and the public key, and
the output control process is a process for displaying the code image on the display unit.

10. A communication device comprising:
a wireless interface configured to execute wireless communication according to Wi-Fi standard;
an output unit; and
a controller configured to:
execute a process for establishing a wireless connection between the communication device and another device via the wireless interface according to a first scheme of the Wi-Fi standard; and
execute a process for establishing a wireless connection between the communication device and another device via the wireless interface according to a second scheme of the Wi-Fi standard, the second scheme being different from the first scheme,
wherein in a case where a second instruction for enabling communication according to the second scheme is obtained while a state of the communication device is a first state, the process for establishing the wireless connection according to the second scheme includes:
shifting the state of the communication device from the first state to a second state, the first state being a state in which the communication device does not respond to an authentication request according to the first scheme and does not respond to a search signal according to the second scheme, the second state being a state in which the communication device does not respond to the authentication request and is capable of responding to the search signal using only a first channel, the first channel being one of a plurality of channels which the wireless interface is capable of using,
wherein in a case where a first instruction for enabling a communication according to the first scheme is obtained while the state of the communication device is the second state, the process for establishing the wireless connection according to the first scheme includes:
executing an output control process for causing the output unit to externally output output-information according to the first scheme, the output-information being information obtained by using channel information indicating a second channel different from the first channel among the plurality of channels and a public key of the communication device; and
shifting the state of the communication device from the second state to a third state, the third state being a state in which the communication device is capable of responding to the authentication request using only the second channel among the plurality of channels and is capable of responding to the search signal using only the second channel among the plurality of channels.

11. The communication device as in claim 10, wherein the process for establishing the wireless connection according to the second scheme further includes:
in the case where the second instruction is obtained while the state of the communication device is the first state, selecting the first channel from the plurality of channels, the second state being a state in which the communication device does not respond to the authentication request and is capable of responding to the search signal using only the selected first channel.

12. The communication device as in claim 11, wherein the first channel is a channel which is currently least used around the communication device.

13. The communication device as in claim 10, wherein the second channel is one channel that is determined in advance among the plurality of channels.

14. The communication device as in claim 10, wherein the second instruction is obtained by a power button of the communication device being operated in a state in which power of the communication device is off, and
the first instruction is obtained by a predetermined button of the communication device different from the power button being operated after the power of the communication device has been turned on.

15. The communication device as in claim 10, wherein
in a case where the first instruction is obtained while the state of the communication device is the second state and the wireless connection between the communication device and another device according to the second scheme is not being established, the state of the communication device is shifted from the second state to the third state, and
in a case where the first instruction is obtained while the state of the communication device is the second state and the wireless connection between the communication device and another device according to the second scheme is being established, the state of the communication device is maintained in the second state.

16. The communication device as in claim 10, wherein the process for establishing the wireless connection according to the first scheme further includes:
sending an authentication response to a terminal device via the wireless interface in a case where the channel information and the public key are obtained by the terminal device in response to the output-information having been externally outputted and the authentication request using the second channel and the public key is received from the terminal device via the wireless interface while the state of the communication device is the third state; and in a case where the authentication response is sent, establishing a first wireless connection between the communication device and a first external device via the wireless interface, wherein the process for establishing the wireless connection according to the second scheme further includes:

sending a search response to a second external device via the wireless interface in a case where the search signal using the first channel is received from the second external device via the wireless interface while the state of the communication device is the second state, or in a case where the search signal using the second channel is received from the second external device via the wireless interface while the state of the communication device is the third state; and in a case where the search response is sent, establishing a second wireless connection between the communication device and the second external device via the wireless interface.

17. The communication device as in claim 10, wherein the first scheme is a Device Provisioning Protocol scheme.

18. The communication device as in claim 10, wherein the second scheme is a Wi-Fi Direct scheme.

19. The communication device as in claim 10, wherein the output unit is a display unit, the output-information is a code image obtained by coding the channel information and the public key, and the output control process is a process for displaying the code image on the display unit.

20. A non-transitory computer-readable recording medium storing computer readable instructions for a communication device, wherein the communication device comprises:
  a wireless interface configured to execute wireless communication according to Wi-Fi standard;
  an output unit; and
  a processor,
the computer-readable instructions, when executed by the processor, cause the communication device to:
execute a process for establishing a wireless connection between the communication device and another device via the wireless interface according to a first scheme of the Wi-Fi standard; and
execute a process for establishing a wireless connection between the communication device and another device via the wireless interface according to a second scheme of the Wi-Fi standard, the second scheme being different from the first scheme,
wherein in a case where a first instruction for enabling communication according to the first scheme is obtained while a state of the communication device is a first state, the process for establishing the wireless connection according to the first scheme includes:
  executing an output control process for causing the output unit to externally output output-information according to the first scheme, the output-information being information obtained by using channel information indicating a target channel and a public key of the communication device, the target channel being one of a plurality of channels which the wireless interface is capable of using; and
  shifting the state of the communication device from the first state to a second state, the first state being a state in which the communication device does not respond to an authentication request according to the first scheme and does not respond to a search signal according to the second scheme, the second state being a state in which the communication device is capable of responding to the authentication request using only the target channel among the plurality of channels and does not respond to the search signal,
wherein in a case where a second instruction for enabling a communication according to the second scheme is obtained while the state of the communication device is the second state, the process for establishing the wireless connection according to the second scheme includes:
  shifting the state of the communication device from the second state to a third state, the third state being a state in which the communication device is capable of responding to the authentication request using only the target channel among the plurality of channels and is capable of responding to the search signal using only the target channel among the plurality of channels.

21. A non-transitory computer-readable recording medium storing computer readable instructions for a communication device, wherein the communication device comprises:
  a wireless interface configured to execute wireless communication according to Wi-Fi standard;
  an output unit; and
  a processor,
the computer-readable instructions, when executed by the processor, cause the communication device to:
execute a process for establishing a wireless connection between the communication device and another device via the wireless interface according to a first scheme of the Wi-Fi standard; and
execute a process for establishing a wireless connection between the communication device and another device via the wireless interface according to a second scheme of the Wi-Fi standard, the second scheme being different from the first scheme,
wherein in a case where a second instruction for enabling communication according to the second scheme is obtained while a state of the communication device is a first state, the process for establishing the wireless connection according to the second scheme includes:
  shifting the state of the communication device from the first state to a second state, the first state being a state in which the communication device does not respond to an authentication request according to the first scheme and does not respond to a search signal according to the second scheme, the second state being a state in which the communication device does not respond to the authentication request and is capable of responding to the search signal using only a first channel, the first channel being one of a plurality of channels which the wireless interface is capable of using,
wherein in a case where a first instruction for enabling a communication according to the first scheme is obtained while the state of the communication device is the second state, the process for establishing the wireless connection according to the first scheme includes:
  executing an output control process for causing the output unit to externally output output-information according to the first scheme, the output-information being information obtained by using channel information indicating a second channel different from the first channel among the plurality of channels and a public key of the communication device; and shifting the state of the communication device from the second state to a third state, the third state being a state in which the communication device is capable of responding to the authentication request using only the second channel among the plurality of channels and is capable of responding to the search signal using only the second channel among the plurality of channels.

* * * * *

UNITED STATES PATENT AND TRADEMARK OFFICE
CERTIFICATE OF CORRECTION

| | |
|---|---|
| PATENT NO. | : 11,357,065 B2 |
| APPLICATION NO. | : 16/919702 |
| DATED | : June 7, 2022 |
| INVENTOR(S) | : Hiroshi Shibata |

It is certified that error appears in the above-identified patent and that said Letters Patent is hereby corrected as shown below:

In the Claims

Column 24, Claim 1, Line 31 should read:
communication according to the second scheme is Column 25, Claim 10, Line 66 should read:
wherein in a case where a first instruction for enabling Column 28, Claim 20, Line 10 should read:
communication according to the second scheme is Column 28, Claim 21, Line 59 should read:
wherein in a case where a first instruction for enabling Signed and Sealed this
Thirty-first Day of January, 2023

Katherine Kelly Vidal
*Director of the United States Patent and Trademark Office*